United States Patent
Nishioka et al.

(10) Patent No.: US 12,111,693 B2
(45) Date of Patent: Oct. 8, 2024

(54) FOLDABLE DISPLAY DEVICE

(71) Applicant: NISSHA CO., LTD., Kyoto (JP)

(72) Inventors: Tasuku Nishioka, Kyoto (JP); Takeshi Nishimura, Kyoto (JP)

(73) Assignee: NISSHA CO., LTD., Kyoto (JP)

( * ) Notice: Subject to any disclaimer, the term of this patent is extended or adjusted under 35 U.S.C. 154(b) by 496 days.

(21) Appl. No.: 17/418,516

(22) PCT Filed: Nov. 22, 2019

(86) PCT No.: PCT/JP2019/045823
§ 371 (c)(1),
(2) Date: Jun. 25, 2021

(87) PCT Pub. No.: WO2020/137288
PCT Pub. Date: Jul. 2, 2020

(65) Prior Publication Data
US 2022/0083102 A1     Mar. 17, 2022

(30) Foreign Application Priority Data
Dec. 28, 2018    (JP) .................................. 2018-248516

(51) Int. Cl.
    *G06F 1/16*        (2006.01)
    *H04M 1/02*      (2006.01)

(52) U.S. Cl.
    CPC .......... *G06F 1/1652* (2013.01); *G06F 1/1616* (2013.01); *G06F 1/1624* (2013.01);
(Continued)

(58) Field of Classification Search
    CPC .... G06F 1/1652; G06F 1/1616; G06F 1/1624; G06F 1/1641; G06F 1/1681;
(Continued)

(56) References Cited

U.S. PATENT DOCUMENTS 6,577,496 B1     6/2003    Gioscia et al.
10,110,717 B1 *   10/2018   Liu ..................... H04M 1/0268
(Continued)

FOREIGN PATENT DOCUMENTS

CN        108415511 A     8/2018
JP         2008-106852 A    5/2008
(Continued)

OTHER PUBLICATIONS

International Search Report dated Feb. 18, 2020 issued in corresponding PCT/JP2019/045823 application (3 pages).

*Primary Examiner* — Eugene Yun
(74) *Attorney, Agent, or Firm* — Millen, White, Zelano & Branigan P.C.; William F. Nixon

(57) ABSTRACT

Problem
A first chassis and a second chassis are pivotably coupled with a simple structure in a foldable display device.
Solution means
A mobile terminal (1) includes a first chassis (3) and a second chassis (5). A pivot coupling portion (9) couples the first chassis (3) and the second chassis (5) to allow an open state and a closed state. The first chassis (3) and the second chassis (5) are open to enter a planar state in the open state. The first chassis (3) and the second chassis (5) are closed to enter a state of being bent inward in the closed state. A flexible display (7) is arranged to cover main surfaces of the first chassis (3) and the second chassis (5). A support member (11) is arranged between the first chassis (3) and the second chassis (5). The support member (11) has a flat support surface (13a) that supports the flexible display (7) when the flexible display (7) is in the open state. The display (7) includes adhesive portions (7a, 7b) and a non-adhesive portion (7c). The adhesive portions (7a, 7b) are adhered to the first chassis (3) and the second chassis (5). The non-adhesive portion (7c) is separable from the flat support
(Continued)

surface (13*a*) of the support member (11) between the first chassis (3) and the second chassis (5).

13 Claims, 51 Drawing Sheets

(52) U.S. Cl.
CPC .......... *G06F 1/1641* (2013.01); *G06F 1/1681* (2013.01); *H04M 1/0216* (2013.01); *H04M 1/0268* (2013.01)

(58) Field of Classification Search
CPC .... G06F 1/1637; G06F 9/301; H04M 1/0216; H04M 1/0268; H04M 1/022; H04M 1/0247; H04M 1/0239
USPC ...................................................... 455/575.3
See application file for complete search history.

(56) References Cited

U.S. PATENT DOCUMENTS

| | | |
|---|---|---|
| 2014/0123436 A1 | 5/2014 | Griffin et al. |
| 2014/0355195 A1 | 12/2014 | Kee et al. |
| 2015/0233162 A1 | 8/2015 | Lee et al. |
| 2017/0061836 A1* | 3/2017 | Kim ...................... G06F 1/1626 |
| 2018/0267574 A1 | 9/2018 | Cho et al. |
| 2018/0335679 A1 | 11/2018 | Hashimoto et al. |

FOREIGN PATENT DOCUMENTS

| | | |
|---|---|---|
| JP | 2015-38609 A | 2/2015 |
| JP | 2016-15618 A | 1/2016 |
| JP | 2017-188027 A | 10/2017 |
| JP | 2017-192659 A | 10/2017 |
| WO | 2013/080191 A2 | 6/2013 |
| WO | 2017/051788 A1 | 3/2017 |

* cited by examiner

FOLDABLE DISPLAY DEVICE

TECHNICAL FIELD

The present disclosure relates to a foldable display device and especially relates to a device provided with a foldable display inside a pair of chassis.

BACKGROUND

In recent years, mobile terminal devices, such as mobile phones and smartphones, have become popular. In particular, in the mobile phones, foldable terminals are widely used. The reason is that although a large screen is desired during use, reduced size is desired for carriage. In the smartphones as well, foldable terminals using seamless displays have been proposed (see, for example, Patent Document 1).

CITATION LIST

Patent Literature

Patent Document 1: WO 2015/126068

SUMMARY

Problems to be Solved by the Present Disclosure

The foldable smartphone of Patent Document 1 employs biaxial hinges. In this case, its folding causes a bent portion of the display to get into under a reference position where the display was originally present. To avoid this bent portion, a base supporting the display also needs to escape downward. This makes the structure complex.

As a foldable smartphone, folding chassis in a Z-shape has also been contemplated. Achieving this allows use with a smartphone size during folding and with a tablet size during unfolding, that is, an advantage of the foldable type can be maximized. However, in this case, a structure in which both external bending and inner bending of the display are performed needs to be achieved.

An object of the present disclosure is to pivotably couple a first chassis and a second chassis with a simple structure in a foldable display device.

Another object of the present disclosure is to allow the chassis to be folded in a Z-shape in the foldable display device.

Features for Solving the Problems

Some aspects will be described below as means to solve the problems. These aspects can be combined arbitrarily as necessary.

A foldable display device according to one aspect of the present disclosure is a device in which a plurality of chassis is foldably coupled. The foldable display device includes a first chassis, a second chassis, a pivot coupling portion, a flexible display, and a support member.

The pivot coupling portion couples the first chassis and the second chassis to allow an open state and a closed state. The first chassis and the second chassis are open to enter a planar state in the open state. The first chassis and the second chassis are closed to enter a state of being bent inward in the closed state.

The display is arranged to cover one surface of the first chassis and the second chassis.

The support member is arranged between the first chassis and the second chassis. The support member has a flat support surface that supports the display when the display is in the open state.

The display includes adhesive portions and a non-adhesive portion. The adhesive portions are adhered to the first chassis and the second chassis. The non-adhesive portion is separable from the flat support surface of the support member between the first chassis and the second chassis.

In this device, in the open state of the first chassis and the second chassis, the non-adhesive portion of the display is supported by the flat support surface of the support member. While the first chassis and the second chassis are in the closed state, the non-adhesive portion of the display bends away from the flat support surface of the support member.

This device simplifies a structure that couples the first chassis and the second chassis.

The pivot coupling portion may have a pivot center that matches the flat support surface when viewed in a direction in which a pivot axis of the pivot coupling portion extends.

When the display is in the closed state, the non-adhesive portion of the display may bend at a position away from the flat support surface.

In this device, while the first chassis and the second chassis are in the closed state, the non-adhesive portion of the display bends so as to be away from the flat support surface upward.

The support member may have a first curved surface and a second curved surface corresponding to portions of a circular arc around a pivot center of the pivot coupling portion when viewed in a direction in which a pivot axis of the pivot coupling portion extends.

The first chassis and the second chassis may have a third curved surface and a fourth curved surface that complementarily support the first curved surface and the second curved surface, respectively.

In this device, the first chassis and the second chassis are guided in a pivot direction by the curved surfaces of the support member during opening/closing operations. Thus, the opening/closing operations of the first chassis and the second chassis are stabilized.

The support member may include a first abutting portion facing the first chassis side and a second abutting portion facing the second chassis side.

The first chassis and the second chassis may include a third abutting portion and a fourth abutting portion. The third abutting portion and the fourth abutting portion may be away from the first abutting portion and the second abutting portion in a rotation direction with the display in the open state, respectively. When the display is in the closed state, the third abutting portion and the fourth abutting portion may abut on the first abutting portion and the second abutting portion, respectively.

In this device, when the first chassis and the second chassis are closed, the third abutting portion of the first chassis and the fourth abutting portion of the second chassis abut on the first abutting portion and the second abutting portion, respectively. Thus, the support member is non-pivotably held between the first chassis and the second chassis and is less likely to rattle.

The foldable display device may further include a first elastic cover member. The first elastic cover member may be fixed to an end on the first chassis side of the second chassis. The first elastic cover member may cover an outer side of the support member when the first chassis and the second chassis transition from the open state to the closed state and while the first chassis and the second chassis are in the closed state.

In this device, in the state where the first chassis and the second chassis are closed or in the middle of being closed, the first elastic cover member covers the outer side of the support member. As a result, an operator does not touch the support member in the above-described state.

The foldable display device may further include a second elastic cover member. The second elastic cover member is fixed to an end on the first chassis side of the second chassis. The second elastic cover member supports the non-adhesive portion of the display while the first chassis and the second chassis are in the open state. The second elastic cover member may cover an outer side of the bent non-adhesive portion in a curved state while the first chassis and the second chassis are in the closed state.

In this device, when the first chassis and the second chassis enter the closed state, the second elastic member covers a non-contact portion in the curved state. Since the second elastic cover member ensures a storage space for the non-contact portion in this way, a thickness of the device in the folded state can be reduced.

A foldable display device according to another aspect of the present disclosure is a device in which a plurality of chassis are foldably coupled. The foldable display device includes a first chassis, a second chassis, a third chassis, a flexible display, a first pivot coupling portion, a second pivot coupling portion, and a movement support member.

The display includes a first adhesive portion and a second adhesive portion, and a non-adhesive portion. The first adhesive portion and the second adhesive portion are arranged so as to cover one surfaces of the first chassis, the second chassis, and the third chassis. The first adhesive portion and the second adhesive portion are adhered to main parts of the first chassis and the third chassis, respectively. The non-adhesive portion is separable from the first chassis, the second chassis, and the third chassis between the first adhesive portion and the second adhesive portion.

The first pivot coupling portion couples the first chassis and the second chassis to allow an open state and a closed state. The first chassis and the second chassis are open and the display enters a planar state in the open state. The first chassis and the second chassis are closed and the display enters a state of being bent outward in the closed state.

The second pivot coupling portion couples the second chassis and the third chassis to allow an open state and a closed state. The second chassis and the third chassis are open and the display enters a planar state in the open state. The second chassis and the third chassis are closed and the display enters a state of being bent inward in the closed state.

The movement support member is arranged in the second chassis to be movable to the first chassis side and the third chassis side. The movement support member is adhered to the non-adhesive portion to support for causing at least a part of the non-adhesive portion to be in a planar state.

In this device, the movement support member supports the non-adhesive portion of the display in the planar state in the second chassis. When the first chassis, the second chassis, and the third chassis are opened and closed, the support slider moves inside the second chassis.

In this device, the chassis can be foldable in a Z-shape.

The movement support member may be a support slider. The foldable display may further include a biasing member. The biasing member couples the second chassis and the support slider and biases the support slider from the first pivot coupling portion side toward the second pivot coupling portion side in the closed state in which the first chassis and the second chassis are closed and the display bends outward.

In this device, when the first chassis and the second chassis are bent outward to be closed, the biasing member biases the support slider toward the second pivot coupling portion side, thus increasing tension in the vicinity of the first pivot coupling portion of the display. As a result, sagging of the display at outer bent portions of the first chassis and the second chassis is suppressed.

The second chassis may include a guide portion that movably guides the support slider to the first chassis side and the third chassis side.

In this device, since the guide portion guides the support slider while the support slider moves inside the second chassis, the movement of the support slider is stabilized.

The support slider may extend long in a direction intersecting with coupling directions of the second chassis to the first chassis and the third chassis.

In this device, the support slider extends long, thereby widening a region in which the display is supported to the support slider in the second chassis portion.

The foldable display device may further include an angle adjustment mechanism. A link member may couple the first chassis and the third chassis so that an angle of the first chassis and an angle of the third chassis with respect to the second chassis are always same.

In this device, the angle of the first chassis and the angle of the third chassis with respect to the second chassis are always same in the middle of the opening/closing operations by the angle adjustment mechanism.

Advantageous Effects of Disclosure

In the foldable display device according to the present disclosure, the first chassis and the second chassis are pivotably coupled with a simple structure.

The foldable display device according to the present disclosure allows the chassis to be folded in the Z-shape.

DETAILED DESCRIPTION

1. First Embodiment (1) General Description

Figure 1:
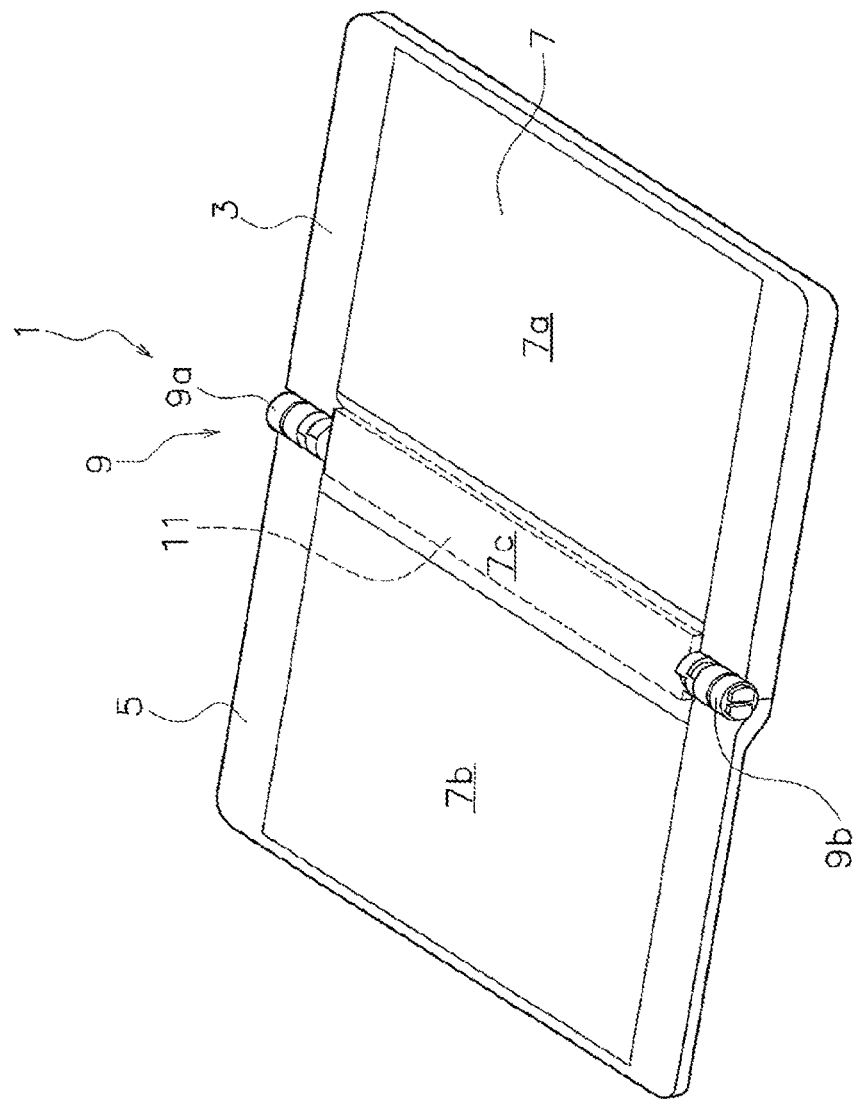
FIG. 1 is a perspective view of a mobile terminal (an open planar state) of a first embodiment.
Figure 2:
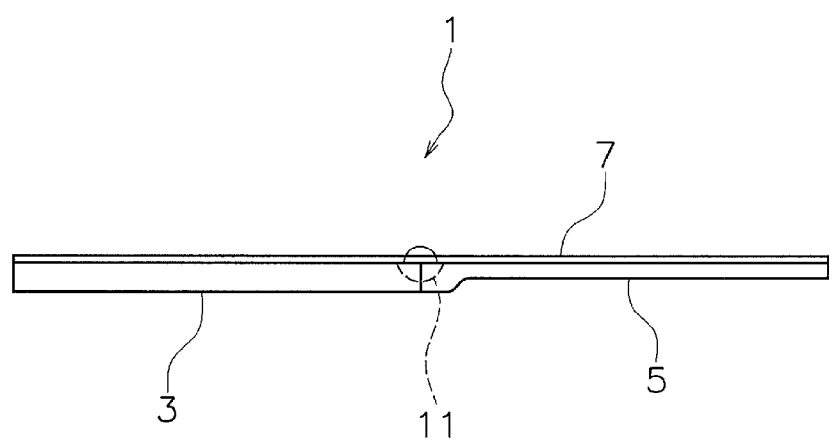
FIG. 2 is a side view of the mobile terminal (the open planar state).
Figure 3:
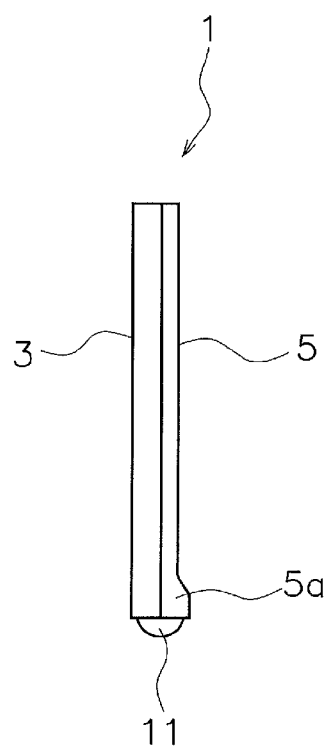
FIG. 3 is a side view of the mobile terminal (a folded state).

A mobile terminal 1 (one example of a foldable display device) according to the first embodiment will be described with reference to FIGS. 1 to 3. FIG. 1 is a perspective view of the mobile terminal (an open planar state) of the first embodiment. FIG. 2 is a side view of the mobile terminal (the open planar state). FIG. 3 is a side view of the mobile terminal (a folded state).

The mobile terminal 1 is a bifold device, and is, for example, a smartphone, a tablet, a mobile phone, a gaming device, and an electronic book terminal.

As illustrated in FIG. 1, the mobile terminal 1 includes a first chassis 3, a second chassis 5, a flexible display 7, a pivot coupling portion 9, and a support member 11.

The first chassis 3 and the second chassis 5 are flat plate-shaped members having a rectangular shape in plan view, and have approximately the same size in plan view. The first chassis 3 and the second chassis 5 have an internal space. Note that the first chassis 3 and the second chassis 5 have long sides close to each other. Hereinafter, in FIG. 1, a direction in which the first chassis 3 and the second chassis 5 are arrayed is referred to as an "array direction", a side where the first chassis 3 and the second chassis 5 are close is referred to as "inward in the array direction", and a side away from there is referred to as "outward in the array direction". Furthermore, a direction in which the long sides of the first chassis 3 and the second chassis 5 extend is referred to as a "long side extension direction".

Note that the first chassis 3 and the second chassis 5 internally include, for example, a control circuit (not illustrated) that, for example, controls an image display in the flexible display 7.

The pivot coupling portion 9 couples the long side inward in the array direction of the first chassis 3 and the long side inward in the array direction of the second chassis 5. This allows an open state (a use state) in which the first chassis 3 and the second chassis 5 are opened to enter a planar state, and a closed state (a storage state) in which the first chassis 3 and the second chassis 5 are closed to enter a state of being bent inward.

As illustrated in FIGS. 1 and 2, when the mobile terminal 1 is in the open state (the use state), the first chassis 3 and the second chassis 5 are arranged so that the main surfaces are substantially flush.

As illustrated in FIG. 3, when the mobile terminal 1 is in the closed state (the folded state), the first chassis 3 and the second chassis 5 are arranged so that the main surfaces face each other in close contact and the respective back surfaces face outward.

The flexible display 7 is one seamless (unitary) piece and is mounted to cover the entire main surfaces of the first chassis 3 and the second chassis 5. In other words, the first chassis 3 and the second chassis 5 have sizes to support the entire back surface of the flexible display 7. The flexible display 7 is a flexible display, such as an organic EL, having a highly flexible paper structure, for example. The flexible display 7 may further include a touch panel.

The flexible display 7 is opened or bent in accordance with an opening/closing operation of the first chassis 3 and the second chassis 5. That is, the flexible display 7 is folded together when the first chassis 3 and the second chassis 5 are folded.

The flexible display 7 includes a pair of adhesive portions 7a, 7b adhered to the first chassis 3 and the second chassis 5, respectively. Between the pair of adhesive portions 7a is a non-adhesive portion 7c not adhered to the first chassis 3 or the second chassis 5. Note that the adhesive portions 7a, 7b are a part or all of the portions corresponding to the first chassis 3 and the second chassis 5 in a flexible display 107, respectively.

The support member 11 is a member for supporting an intermediate portion of the flexible display 7, namely, the non-adhesive portion 7c, in the state where the mobile terminal 1 is open. The support member 11 is arranged between the first chassis 3 and the second chassis 5 and extends long in the long side extension direction. The support member 11 has a flat support surface 13a (described later) that supports the non-adhesive portion 7c of the flexible display 7 when the mobile terminal 1 is in the open state. Note that the non-adhesive portion 7c can be separated from the flat support surface 13a of the support member 11.

This device eliminates the need for providing a special structure for storing a bent portion of the flexible display 7. This simplifies the structure that couples the first chassis 3 and the second chassis 5.

(2) Detailed Description (2-1) Pivot Coupling Portion

As illustrated in FIG. 1, the pivot coupling portion 9 includes a pair of hinges 9a, 9b provided on both end portions of the first chassis 3 and the second chassis 5. The pair of hinges 9a, 9b are uniaxial hinges and are provided on both ends in the long side extension direction of the first chassis 3 and the second chassis 5. The pair of hinges 9a, 9b couple the first chassis 3 and the second chassis 5 so as to ensure the folded state illustrated in FIG. 1 and the planar state illustrated in FIG. 2.

(2-2) Support Member

Figure 4:
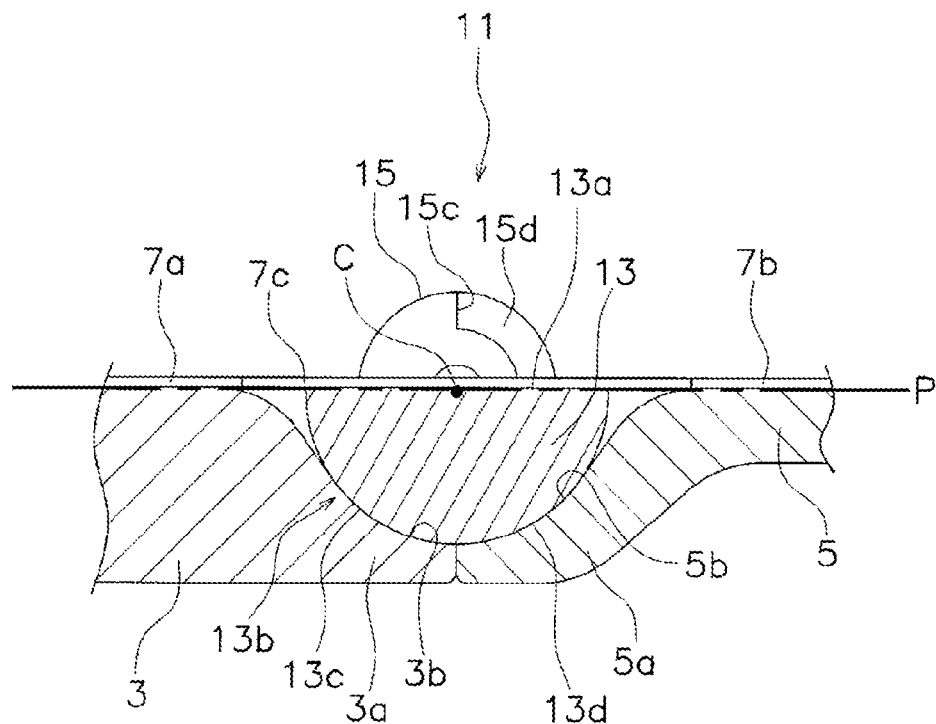
FIG. 4 is a cross-sectional view of a support member and a periphery thereof.
Figure 5:
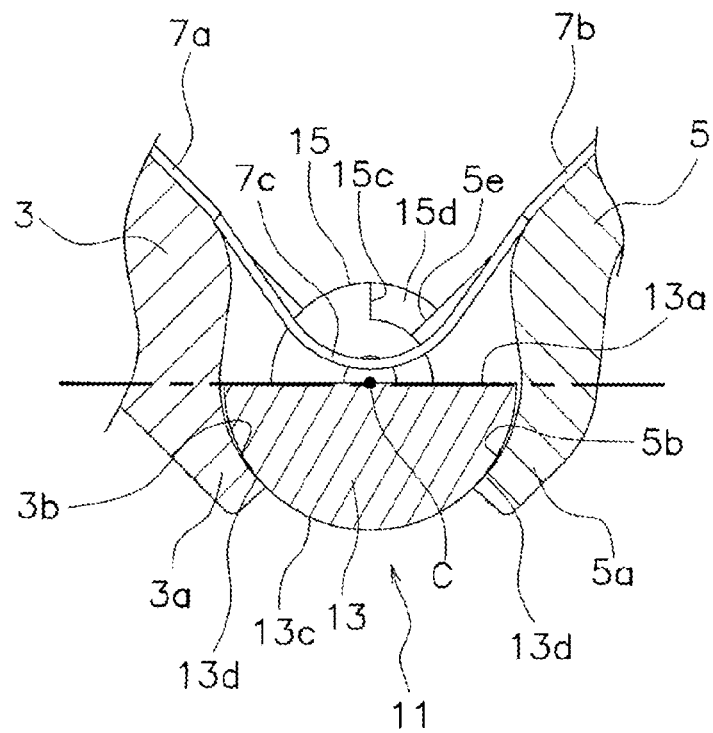
FIG. 5 is a cross-sectional view of the support member and the periphery thereof.
Figure 6:
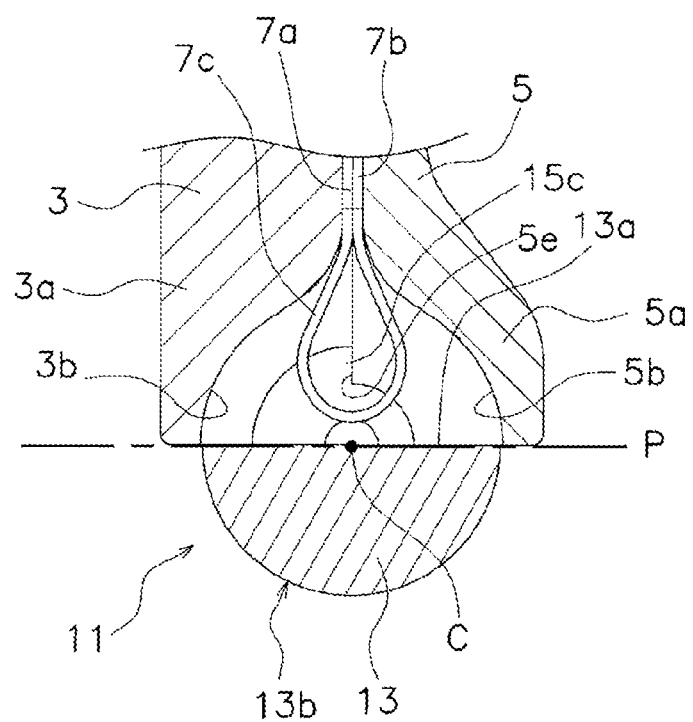
FIG. 6 is a cross-sectional view of the support member and the periphery thereof.
Figure 7:
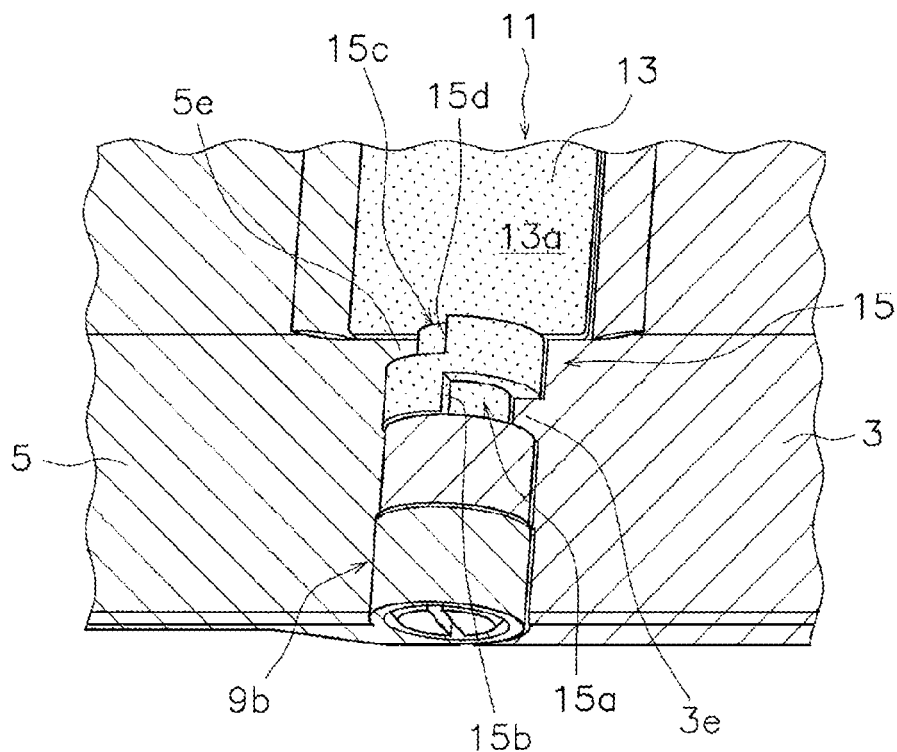
FIG. 7 is a schematic partial plan view of hinge mechanisms and the support member.

With reference to FIGS. 4 to 7, the support member 11 will be described in detail. FIGS. 4 to 6 are cross-sectional views of the support member and a periphery thereof. FIG. 7 is a schematic partial plan view of hinge mechanisms and the support member.

The support member 11 includes a support body 13. The support body 13 is an elongated extending member and has the flat support surface 13a on the upper side and a curved surface 13b on the lower side. The curved surface 13b has a first curved surface 13c and a second curved surface 13d corresponding to portions of a circular arc around a pivot center C of the pivot coupling portion 9 when viewed in a direction in which a pivot axis of the pivot coupling portion 9 extends.

The first chassis 3 and the second chassis 5 have an inner end 3a and an inner end 5a arranged so as to cover the curved surface 13b of the support body 13. Specifically, as illustrated in FIG. 4, the inner end 3a and the inner end 5a are open upward to ensure a recess that stores the lower portion of the support body 13.

The inner end 3a and the inner end 5a have a third curved surface 3b and a fourth curved surface 5b that complementarily support the first curved surface 13c and the second curved surface 13d, respectively.

The support member 11 includes a pair of locking members 15 provided on both ends of the support body 13. The pair of locking members 15 are arranged to be close to the pair of hinges 9a, 9b inward in the long side extension direction. As illustrated in FIGS. 4 and 7, the locking member 15 includes a first groove 15a formed on the first chassis 3 side. The first groove 15a includes a first wall surface 15b constituting a vertical surface facing the first chassis 3 side. As illustrated in FIG. 7, the locking member 15 includes a second groove 15c formed on the second chassis 5 side. The second groove 15c includes a second wall surface 15d constituting a vertical surface facing the second chassis 5 side. The first chassis 3 and the second chassis 5 include a third abutting portion 3e and a fourth abutting portion 5e, respectively. The third abutting portion 3e and the fourth abutting portion 5e are arranged so as to be separated in the pivot direction with respect to the first wall surface 15b and the second wall surface 15d in the open state of the flexible display 7.

When the flexible display 7 enters the closed state, the third abutting portion 3e and the fourth abutting portion 5e abut on the first wall surface 15b and the second wall surface 15d, respectively. As a result, the support member 11 is sandwiched in the pivot direction between the first chassis 3 and the second chassis 5, and thus is fixed in the pivot direction with respect to the first chassis 3 and the second chassis 5.

Note that, as illustrated in FIG. 4, when viewed in a direction in which the pivot axis of the pivot coupling portion 9 extends (matches the long side extension direction), the pivot center C of the pivot coupling portion 9 (that is, the center of the folding operation of the first chassis 3 and the second chassis 5) matches the flat support surface 13a of the support member 11.

(2-3) Flexible Display

As illustrated in FIG. 6, when the flexible display 7 is in the bent state, the non-adhesive portion 7c of the flexible display 7 bends at a position away from the flat support surface 13a. In this way, a radius of curvature of the non-adhesive portion 7c becomes large, thereby reducing tension. Therefore, even when the number of times of bending of the first chassis 3 and the second chassis 5 increases, damage or deterioration of the bent portion of the flexible display 7 is unlikely to occur.

(3) Opening/Closing Operation

In FIG. 4, the first chassis 3 and the second chassis 5 extend in one predetermined direction and are in the open state, and the flexible display 7 also extends in the one predetermined direction to form a planar shape. Specifically, the non-adhesive portion 7c of the flexible display 7 is supported from below by the flat support surface 13a of the support body 13. At this time, the inner end 3a of the first chassis 3 and the inner end 5a of the second chassis 5 abut on each other in the array direction, and thus the first chassis 3 and the second chassis 5 are not opened further. Additionally, the support member 11 is covered with the inner end 3a and the inner end 5a, that is, is not exposed downward.

In FIG. 5, the first chassis 3 and the second chassis 5 are in the middle of bending state, the third curved surface 3b slides to the first curved surface 13c, and the fourth curved surface 5b slides to the second curved surface 13d. In this manner, the first chassis 3 and the second chassis 5 are guided in the pivot direction by the curved surface 13b of the support member 11 during the opening/closing operations. Thus, the opening/closing operations of the first chassis 3 and the second chassis 5 are stabilized.

At this time, the non-adhesive portion 7c of the flexible display 7 bends away from the flat support surface 13a of the support body 13 upward.

In FIG. 6, the first chassis 3 and the second chassis 5 are in the folded state in which first chassis 3 and the second chassis 5 are closed. Specifically, the non-adhesive portion 7c of the flexible display 7 bends away from the flat support surface 13a of the support body 13 of the support member 11 upward.

(4) First Modified Example

Figure 8:
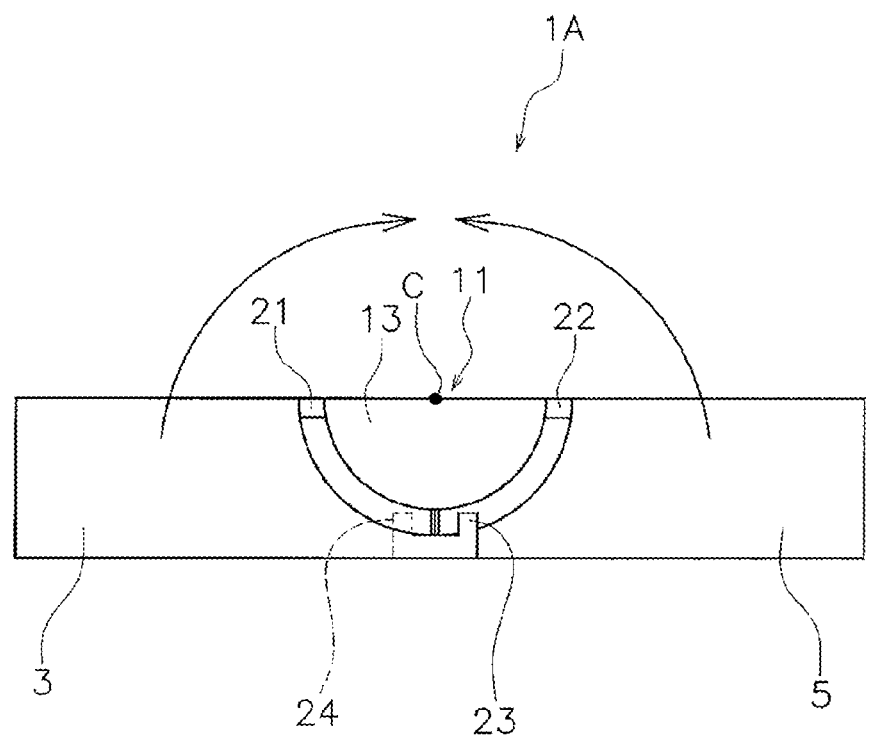
FIG. 8 is a schematic side view of a mobile terminal (an open planar state) of a first modified example.
Figure 9:
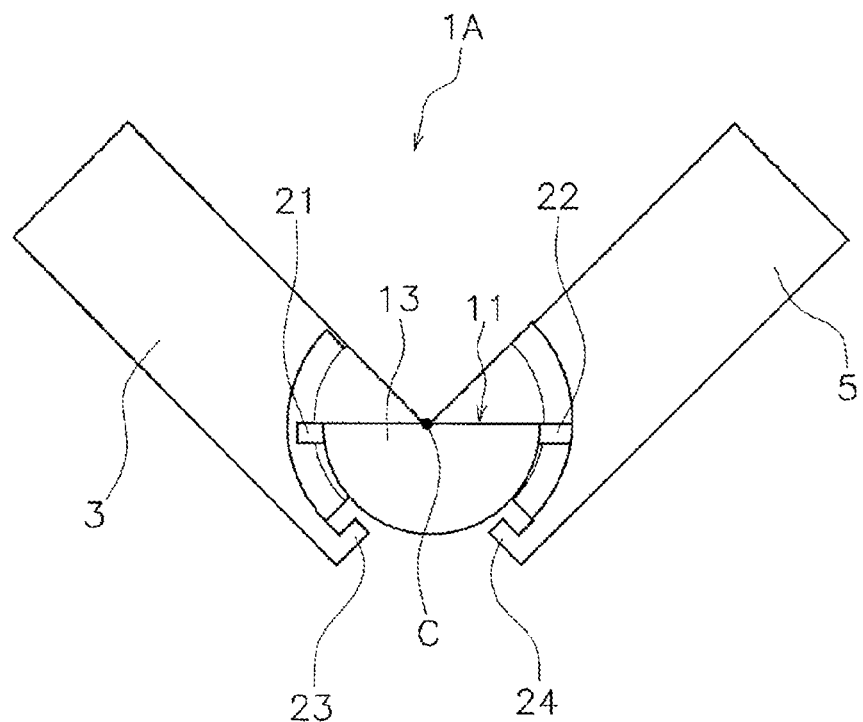
FIG. 9 is a schematic side view of the mobile terminal (a state in the middle of folding) of the first modified example.
Figure 10:
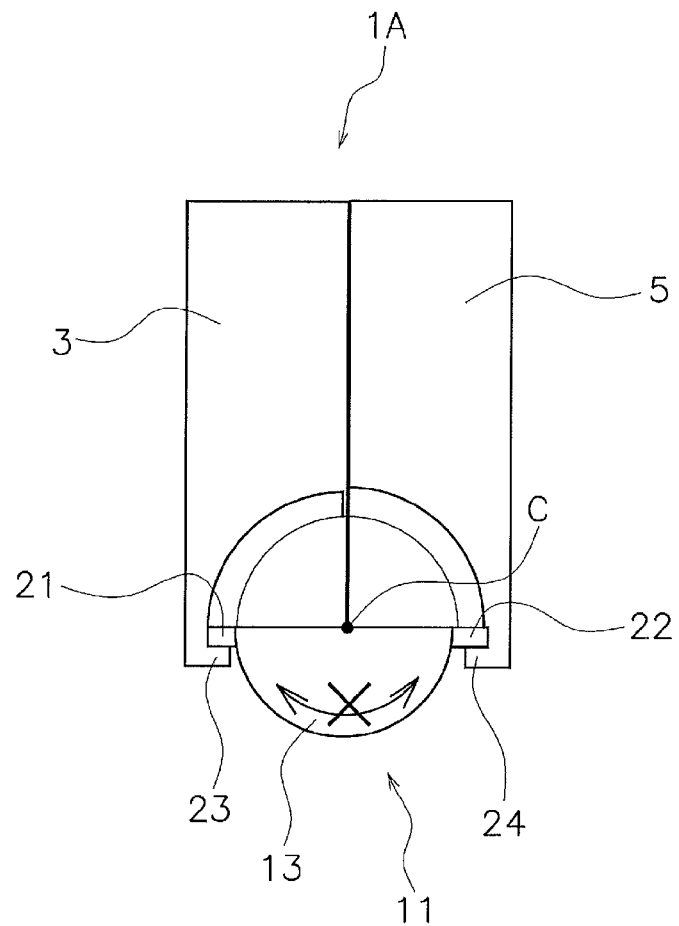
FIG. 10 is a schematic side view of the mobile terminal (a folded state) of the first modified example.

As a modified example of the first embodiment, the first modified example will be described with reference to FIGS. 8 to 10. FIG. 8 is a schematic side view of a mobile terminal (an open planar state) of the first modified example. FIG. 9 is a schematic side view of the mobile terminal (a state in the middle of folding) of the first modified example. FIG. 10 is a schematic side view of the mobile terminal (a folded state) of the first modified example.

Note that basic structures of the following first to sixth modified examples are the same as that of the first embodiment. Thus, the common points are simplified or omitted.

In the first modified example, it will be described a structure that makes the support member 11 unturnable with the first chassis 3 and the second chassis 5 folded.

In FIG. 8, a mobile terminal 1A is in an open use state.

The support member 11 includes a first support member claw portion 21 and a second support member claw portion 22 that protrude on both sides in the array direction in upper lateral side. Furthermore, the first chassis 3 includes a first chassis claw portion 23 that protrudes upward at the lower portion on the second chassis 5 side. The second chassis 5 includes a second chassis claw portion 24 that protrudes upward at the lower portion on the first chassis 3 side.

As illustrated in FIG. 9, during the folding of the mobile terminal 1A, the first chassis claw portion 23 approaches the first support member claw portion 21 from below, and the second chassis claw portion 24 approaches the second support member claw portion 22 from below.

As illustrated in FIG. 10, when the mobile terminal 1A is folded, the first chassis claw portion 23 abuts on the first support member claw portion 21 from below, and the second chassis claw portion 24 approaches the second support member claw portion 22 from below. As a result, the support member 11 cannot pivot with respect to the first chassis 3 or the second chassis 5.

(5) Second Modified Example

Figure 11:
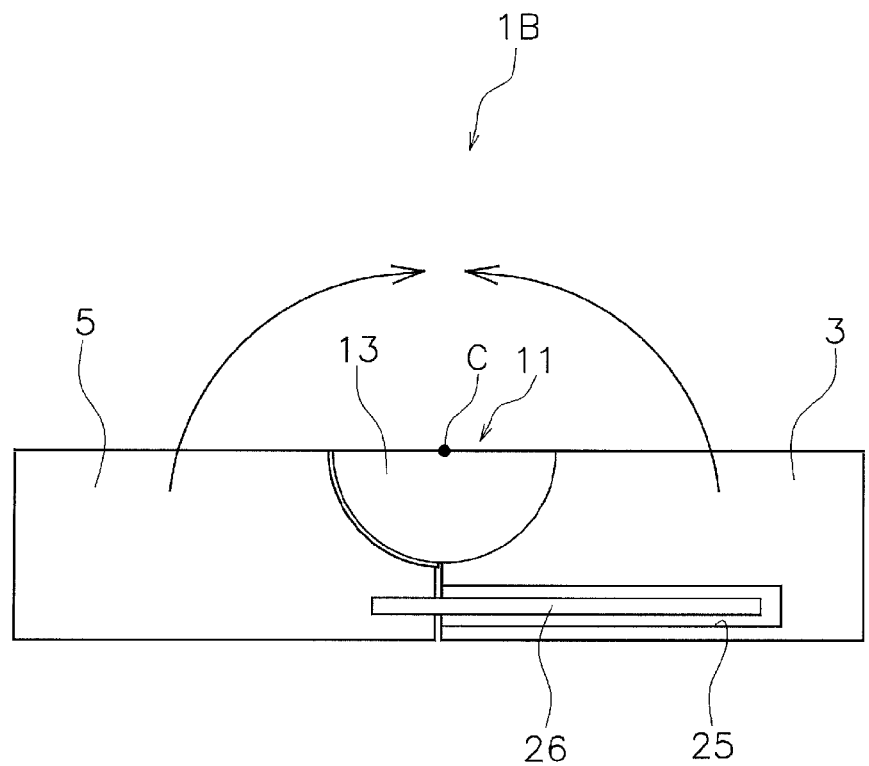
FIG. 11 is a schematic side view of a mobile terminal (an open planar state) of a second modified example.
Figure 12:
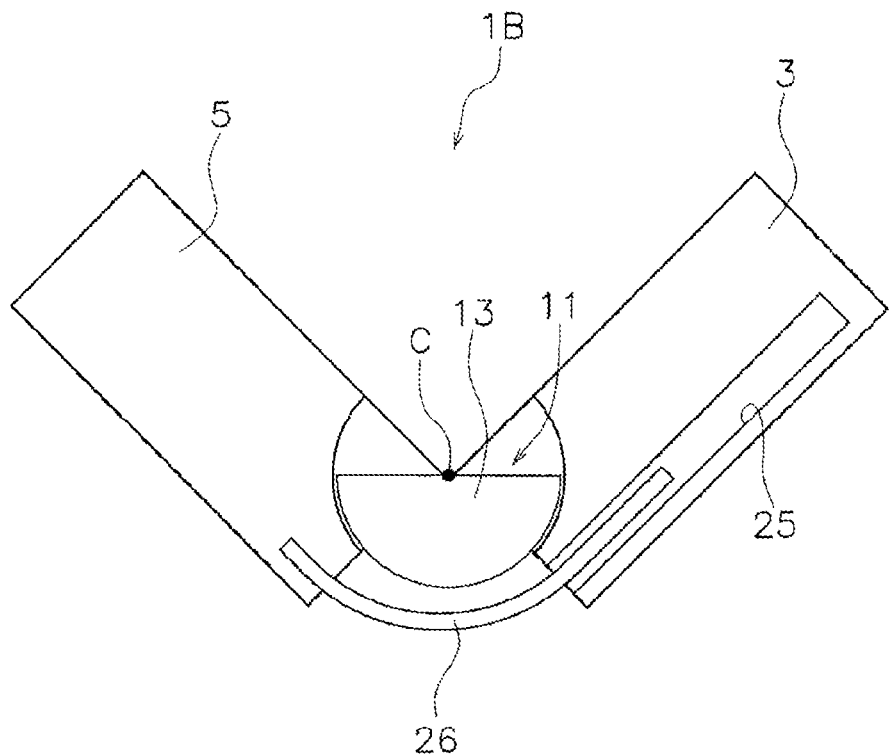
FIG. 12 is a schematic side view of the mobile terminal (a state in the middle of folding) of the second modified example.
Figure 13:
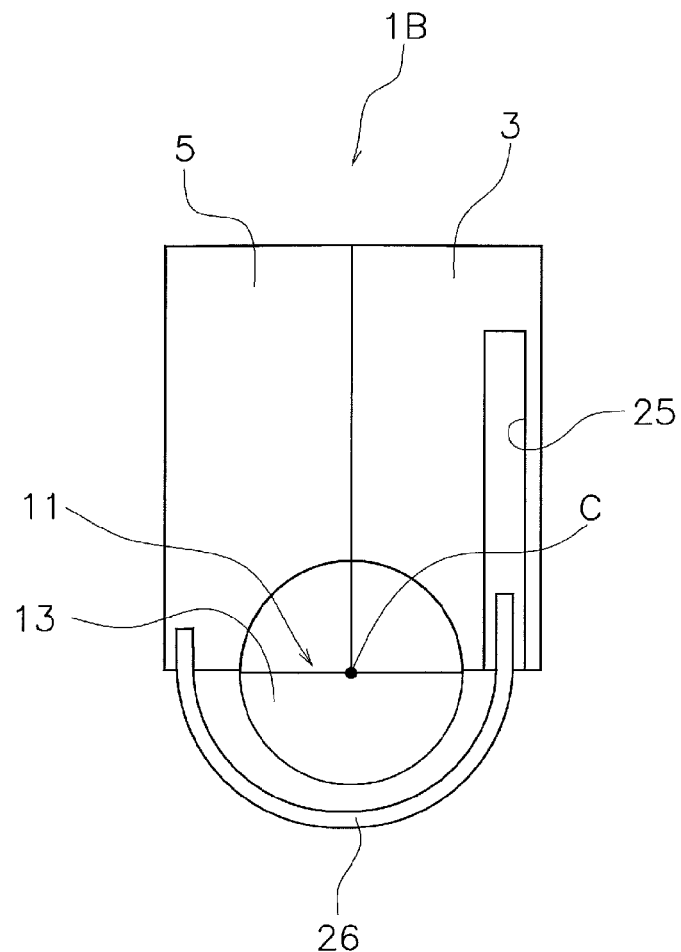
FIG. 13 is a schematic side view of the mobile terminal (a folded state) of the second modified example.

As a modified example of the first embodiment, the second modified example will be described with reference to FIGS. 11 to 13. FIG. 11 is a schematic side view of a mobile terminal (an open planar state) of the second modified example. FIG. 12 is a schematic side view of the mobile terminal (a state in the middle of folding) of the second modified example. FIG. 13 is a schematic side view of the mobile terminal (a folded state) of the second modified example.

In the second modified example, a structure in which a worker cannot touch the support member 11 in the state in which the first chassis 3 and the second chassis 5 are folded will be described.

In FIG. 11, a mobile terminal 1B is in an open use state.

The mobile terminal 1B includes a plate member 26 (one example of a first elastic cover member). The plate member 26 is a member that covers the outer side (the lower side of the drawing) of the support member 11 when the first chassis 3 and the second chassis 5 transition from the open state to the closed state and while the first chassis 3 and the second chassis 5 are in the closed state.

Specifically, the first chassis 3 has a recessed portion 25 that extends in the array direction on the lower portion and opens to the second chassis 5 side. The recessed portion 25 is formed long in the long side extension direction as well.

The plate member 26 is movably arranged in the recessed portion 25. The plate member 26 is a rectangular member extending in the array direction and the long side extension direction. The end portion on the second chassis 5 side of the plate member 26 is fixed to the second chassis 5. The plate member 26 has a flexible property.

As illustrated in FIG. 12, during the folding of the mobile terminal 1B, the plate member 26 comes out from the recessed portion 25. At this time, the plate member 26 has a curved shape and covers the lower portion of the support member 11.

As illustrated in FIG. 13, when the mobile terminal 1B is folded, the plate member 26 has the curved shape and covers the lower portion of the support member 11. As a result, a user does not touch the support member 11.

(6) Third Modified Example

Figure 14:
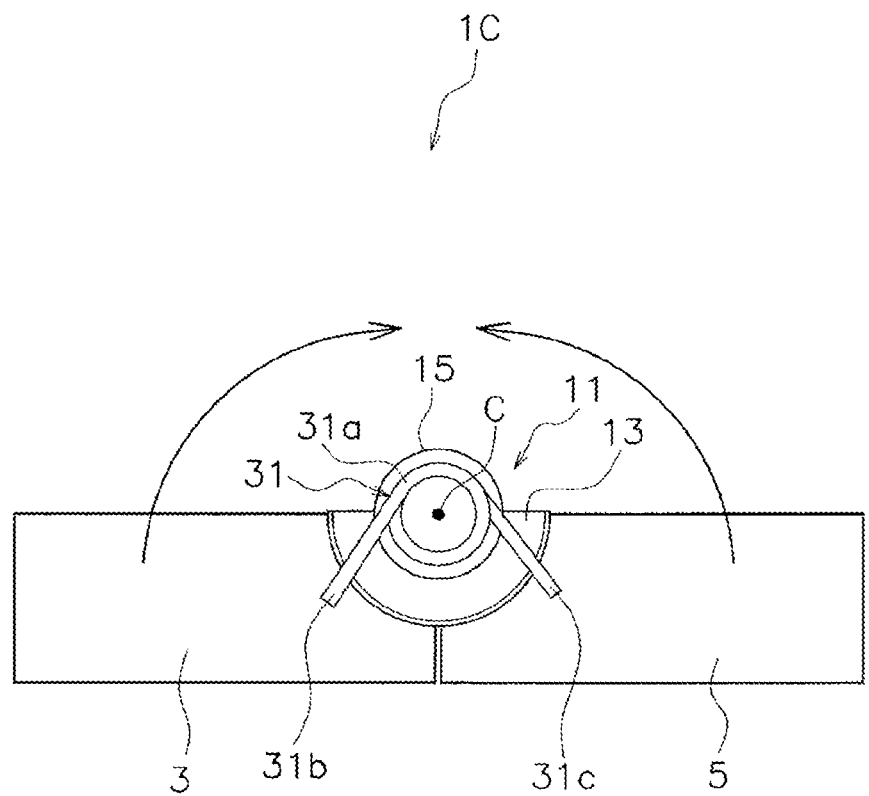
FIG. 14 is a schematic side view of a mobile terminal (an open planar state) of a third modified example.
Figure 15:
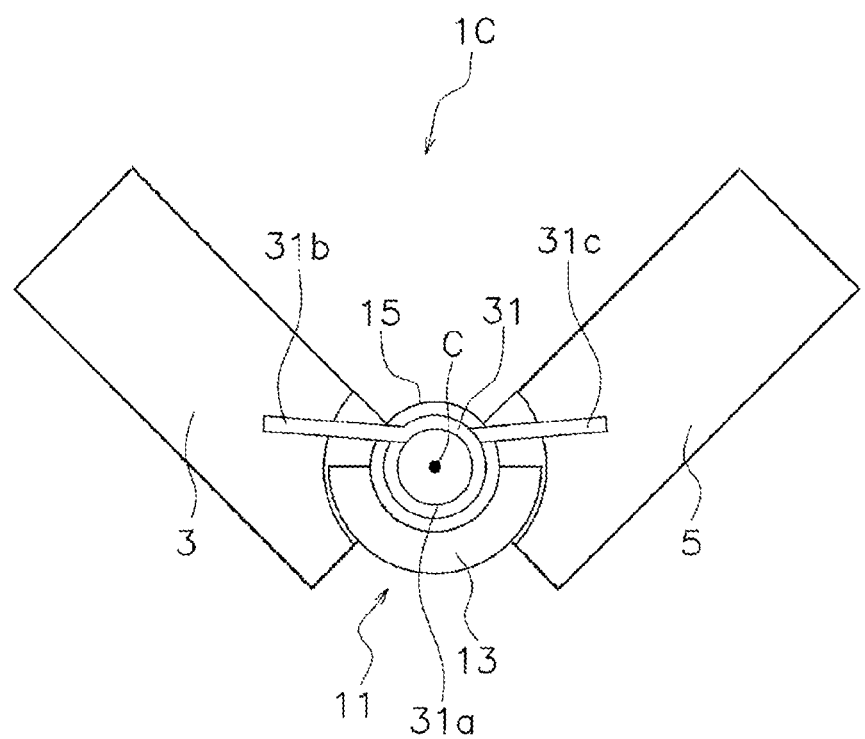
FIG. 15 is a schematic side view of the mobile terminal (a state in the middle of folding) of the third modified example.
Figure 16:
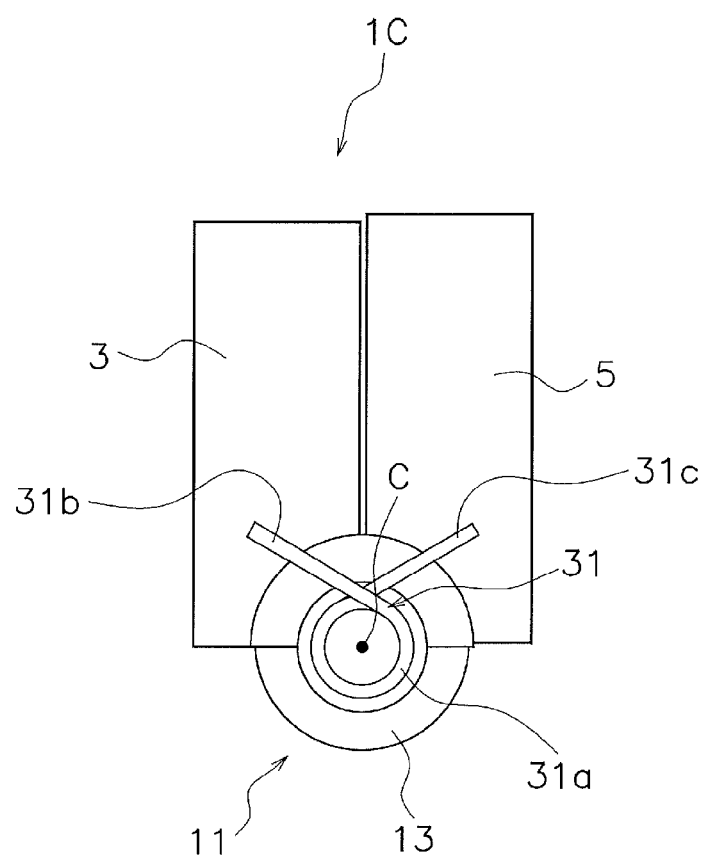
FIG. 16 is a schematic side view of the mobile terminal (the state in the middle of folding) of the third modified example.

As a modified example of the first embodiment, the third modified example will be described with reference to FIGS. 14 to 16. FIG. 14 is a schematic side view of a mobile terminal (an open planar state) of the third modified example. FIG. 15 is a schematic side view of the mobile terminal (a state in the middle of folding) of the third modified example. FIG. 16 is a schematic side view of the mobile terminal (a state in the middle of folding) of the third modified example.

In the third modified example, a structure in which the support member 11 cannot pivot with the first chassis 3 and the second chassis 5 folded will be described.

In FIG. 14, a mobile terminal 1C is in an open use state.

To the locking member 15 of the support member 11, a winding portion 31a of a torsion spring 31 is fixed. Both ends 31b, 31c of the torsion spring 31 are fixed to the first chassis 3 and the second chassis 5, respectively.

As illustrated in FIG. 15, during the folding of the mobile terminal 1C, the torsion spring 31 deforms.

As illustrated in FIG. 16, when the mobile terminal 1 C is folded, the torsion spring 31 further deforms. In this state, the support member 11 cannot pivot with respect to the first chassis 3 or the second chassis 5 with the torsion spring 31.

(7) Fourth Modified Example

Figure 17:
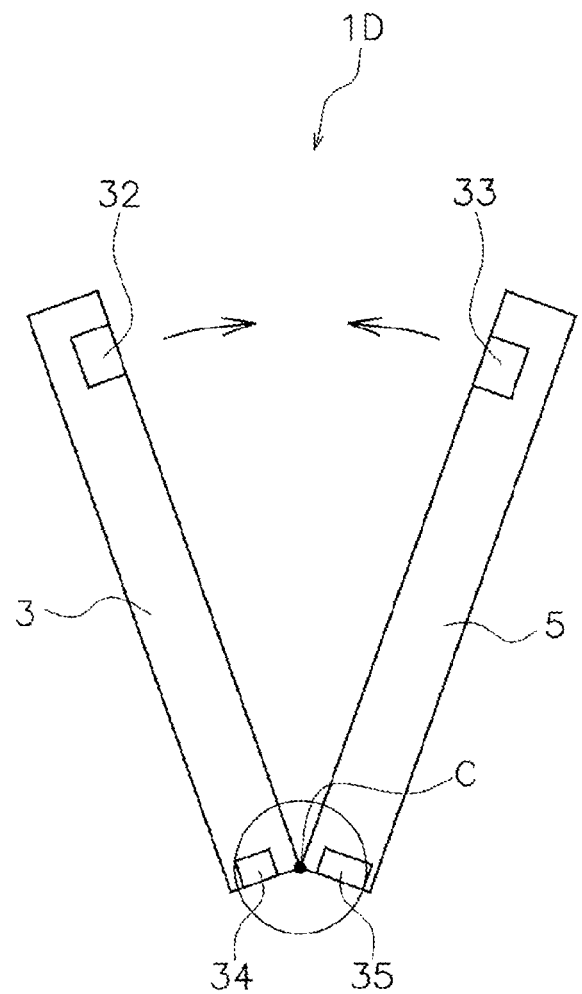
FIG. 17 is a schematic side view of a mobile terminal (a state in the middle of folding) of a fourth modified example.

As a modified example of the first embodiment, the fourth modified example will be described with reference to FIG. 17. FIG. 17 is a schematic side view of a mobile terminal (a state in the middle of folding) of the fourth modified example.

In the fourth modified example, a structure in which the posture can be maintained in a state where the first chassis 3 and the second chassis 5 are folded or are open will be described.

In FIG. 17, a mobile terminal 1D is in a state in the middle of folding. A first magnet 32 is provided on a main surface outward in the array direction of the first chassis 3. A second magnet 33 is provided on a main surface outward in the array direction of the second chassis 5. When the mobile terminal 1D is folded, the first magnet 32 and the second magnet 33 abut on to maintain the folded state of the mobile terminal 1D. Note that one of the magnets may be a ferromagnetic material.

A third magnet 34 is provided on a distal end inward in the array direction of the first chassis 3. A fourth magnet 35 is provided on a distal end inward in the array direction of the second chassis 5. When the mobile terminal 1D is opened, the third magnet 34 and the fourth magnet 35 abut on to maintain the planar state of the mobile terminal 1D. Note that one of the magnets may be a ferromagnetic material.

Note that the fixing of the first chassis 3 and the second chassis 5 using the magnets may be used only in one of the folded state and the open state.

(8) Fifth Modified Example

Figure 18:
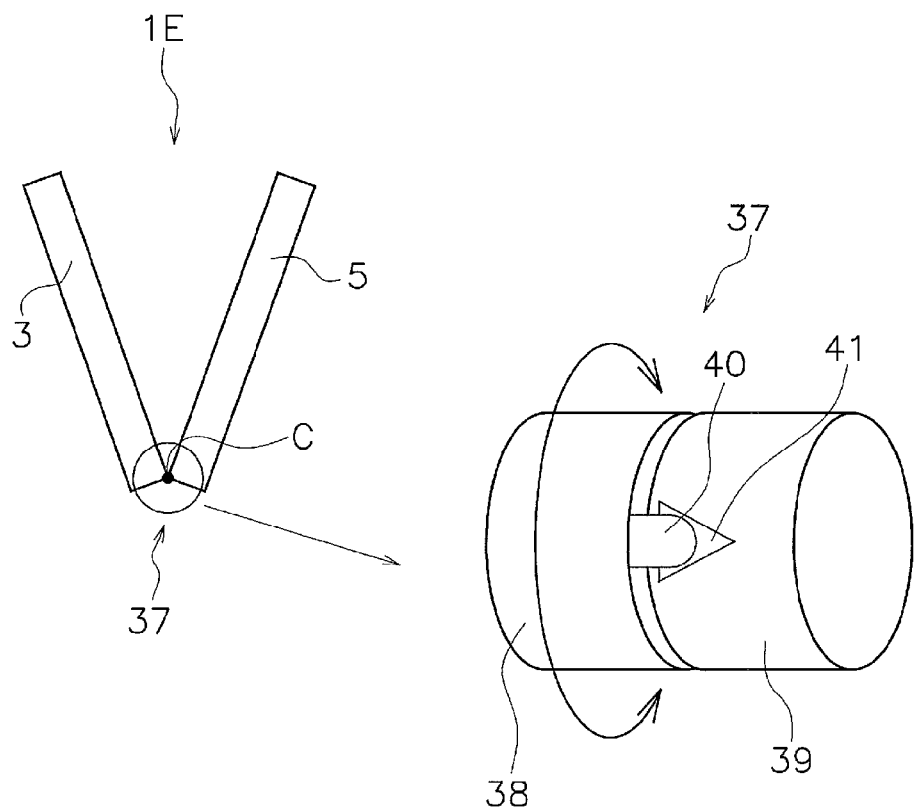
FIG. 18 is a schematic side view of a mobile terminal (a state in the middle of folding) of a fifth modified example.

As a modified example of the first embodiment, the fifth modified example will be described with reference to FIG. 18. FIG. 18 is a schematic side view of a mobile terminal (a state in the middle of folding) of the fifth modified example.

In the fifth modified example, a structure in which the posture can be maintained in a state where the first chassis 3 and the second chassis 5 are folded or are open will be described.

In FIG. 18, a mobile terminal 1E is in a state in the middle of folding.

A hinge mechanism 37 of the pivot coupling portion 9 includes a first pivot member 38 and a second pivot member 39. The first pivot member 38 includes a plunger 40 biased by a force of a spring (not illustrated). The second pivot member 39 includes a pair of grooves 41 (only one of them is illustrated) at positions separated by 180 degrees in the pivot direction.

When the plunger 40 enters the inside of the groove 41, in a case where a force causing the first pivot member 38 and the second pivot member 39 to pivot is a predetermined force or less, the first pivot member 38 and the second pivot member 39 do not pivot with respect to each other. Thus, the respective folded state and open state of the first chassis 3 and the second chassis 5 are maintained.

(9) Sixth Modified Example

Figure 19:
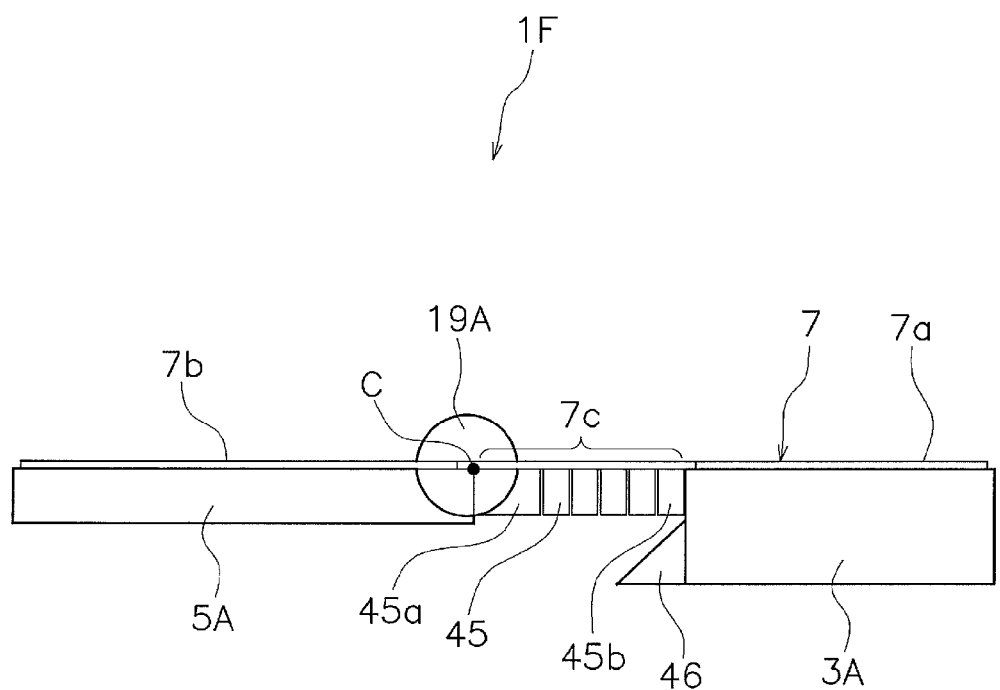
FIG. 19 is a schematic side view of a mobile terminal (an open planar state) of a sixth modified example.
Figure 20:
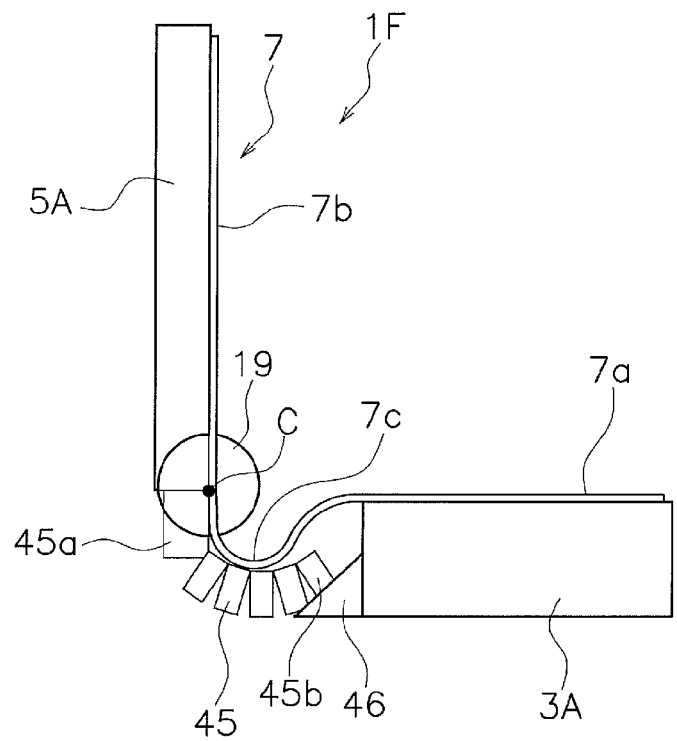
FIG. 20 is a schematic side view of the mobile terminal (a state in the middle of folding) of the sixth modified example.
Figure 21:
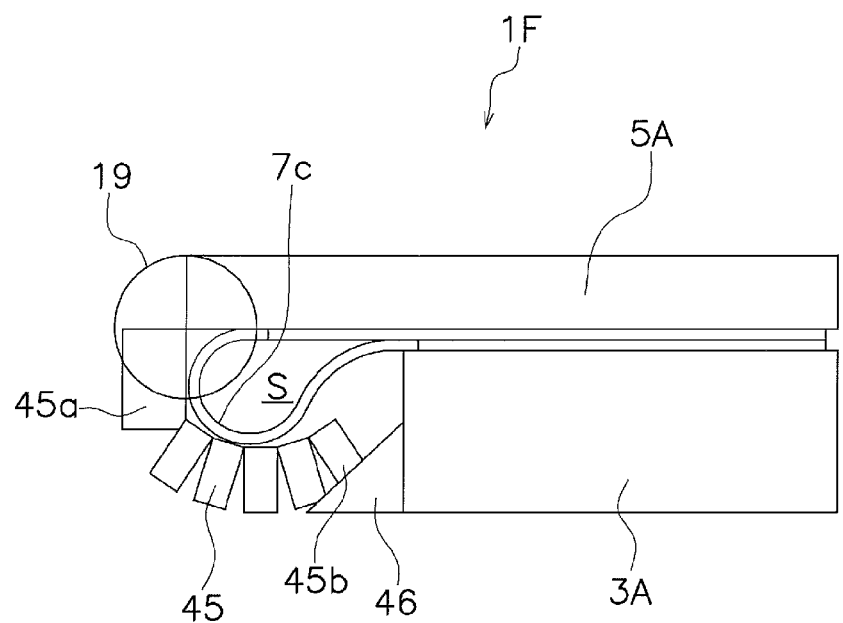
FIG. 21 is a schematic side view of the mobile terminal (a folded state) of the sixth modified example.

As a modified example of the first embodiment, the sixth modified example will be described with reference to FIGS. 19 to 21. FIG. 19 is a schematic side view of a mobile terminal (an open planar state) of the sixth modified example. FIG. 20 is a schematic side view of the mobile terminal (a state in the middle of folding) of the sixth modified example. FIG. 21 is a schematic side view of the mobile terminal (a folded state) of the sixth modified example.

In the sixth modified example, a structure in which a thickness of the mobile terminal can be reduced will be described.

In FIG. 19, a mobile terminal 1F is in an open use state.

A first chassis 3A has both ends on a second chassis 5A side in the long side extension direction extend toward the second chassis 5A and are pivotably coupled, and the long side inward in the array direction of the first chassis 3A is arranged to be separated from the long side inward in the array direction of the second chassis 5A in the arranged direction.

The mobile terminal 1F includes a bellows member 45 (one example of a movement support member and a second elastic cover member). The bellows member 45 is arranged on the long side on the second chassis side of the second chassis 5A. The bellows member 45 supports the non-adhesive portion 7c of the flexible display 7 while the first chassis 3A and the second chassis 5A are in an open state, and covers the outer side of the bent non-adhesive portion 7c in the curved state in a state where the first chassis 3A and the second chassis 5A transition from the open state to the closed state or while the first chassis 3A and the second chassis 5A are in the closed state.

Specifically, the bellows member 45 extends further from the long side inward in the arranged direction of the second chassis 5A to the first chassis 3A side to support the non-adhesive portion 7c of the flexible display 7 from below. The bellows member 45 has a first end 45a in the array direction that abuts on or approaches an end portion inward in the array direction of the second chassis 5A to be supported, and a second end 45b in the array direction that abuts on or approaches the long side inward in the arranged direction of a first chassis 5B to be supported.

The first chassis 3A includes a support member 46 having an inclined support surface in side view at the lower portion inward in the array direction.

As illustrated in FIG. 20, during the folding of the mobile terminal 1F, the non-adhesive portion 7c of the flexible display 7 is bent. At this time, the bellows member 45 covering the non-adhesive portion 7c of the flexible display 7 is curved while the second end 45b in the array direction is supported to the inclined surface of the support member 46.

As illustrated in FIG. 21, when the mobile terminal 1F is folded, the non-adhesive portion 7c of the flexible display 7 enters the most bent state, and further the bellows member 45 is maintained in the state of covering the non-adhesive portion 7c. At this time, the second end 45b in the array direction of the bellows member 45 is supported to the inclined surface of the support member 46. Further, at this timing, the first end 45a in the array direction of the bellows member 45 is separated from the end portion inward in the array direction of the second chassis 5A.

In this embodiment, in the folded state, the bellows member 45 falls within the thickness range of the first chassis 3A and does not increase the thickness of the mobile terminal 1F. Additionally, the bellows member 45 ensures a space S that stores the non-adhesive portion 7c of the flexible display 7 in the bent state, and further the space S is covered with the bellows member 45.

As illustrated in FIG. 21, by storing the non-adhesive portion 7c in the space S, the radius of curvature of the non-adhesive portion 7c becomes large, thereby reducing tension. Therefore, even when the number of times of bending of the first chassis 3A and the second chassis 5A increases, damage or deterioration of the bent portion of the flexible display 7 is unlikely to occur.

Furthermore, in this embodiment, the flat surface is maintained without, for example, a protrusion on the back surface side inward in the array direction of the second chassis 5A.

Note that another elastically deformable member (for example, a rubber member) may be used instead of the bellows member.

2. Second Embodiment (1) General Description

Figure 22:
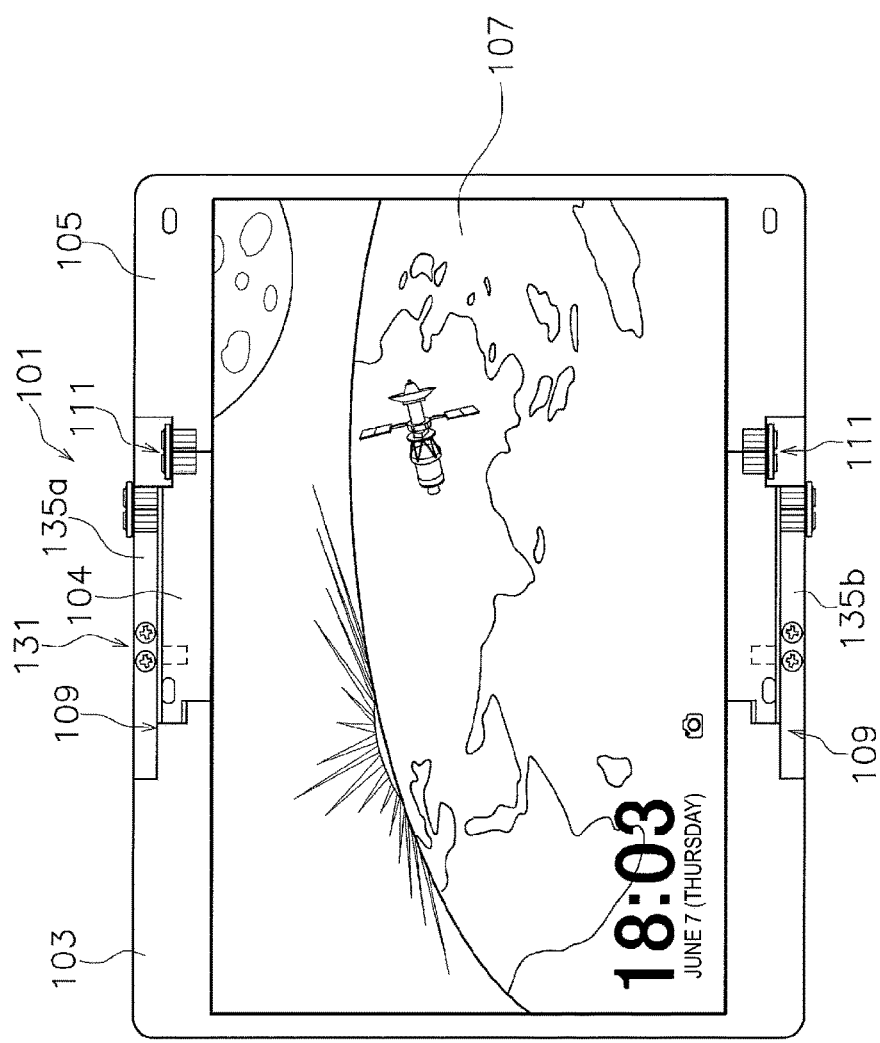
FIG. 22 is a plan view of a mobile terminal (an open planar state) of a second embodiment.
Figure 23:
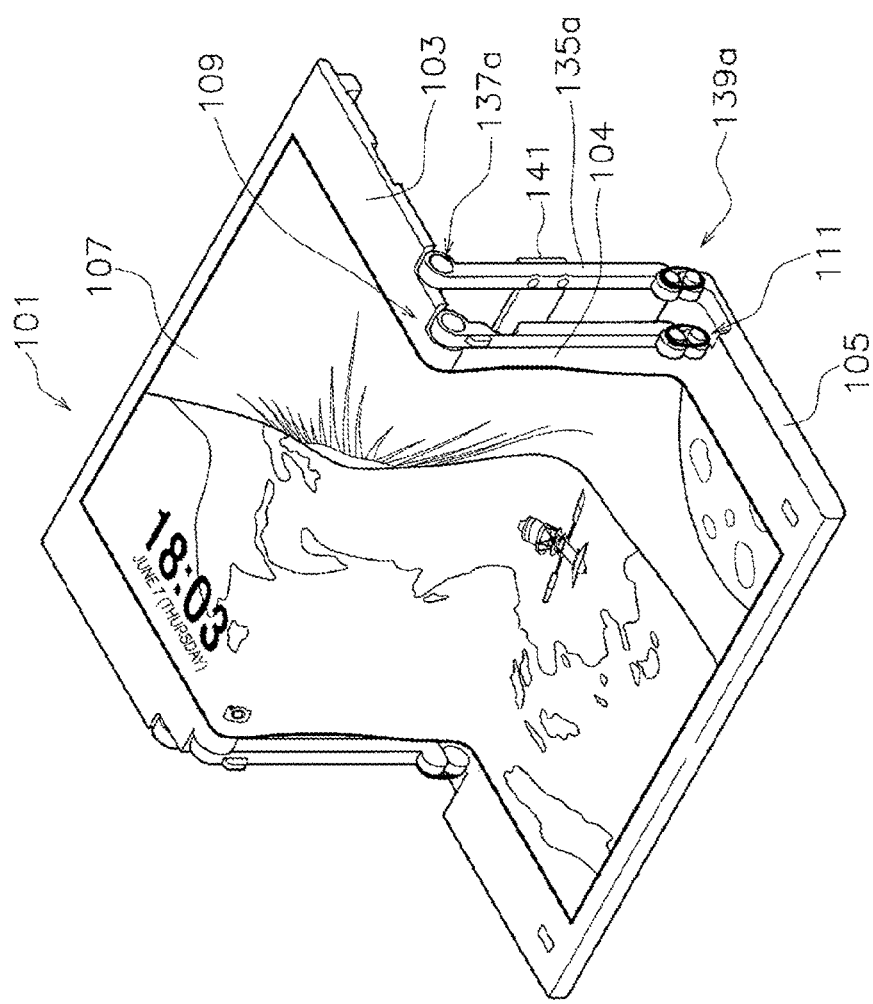
FIG. 23 is a perspective view of the mobile terminal (a first stage in the middle of bending).
Figure 24:
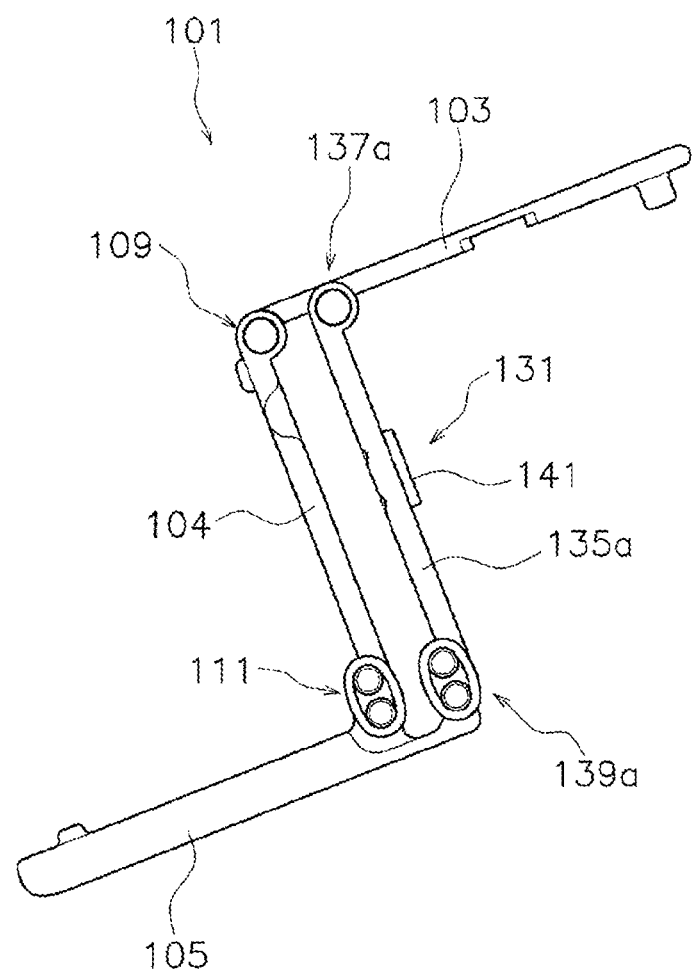
FIG. 24 is a side view of the mobile terminal (the first stage in the middle of bending).
Figure 25:
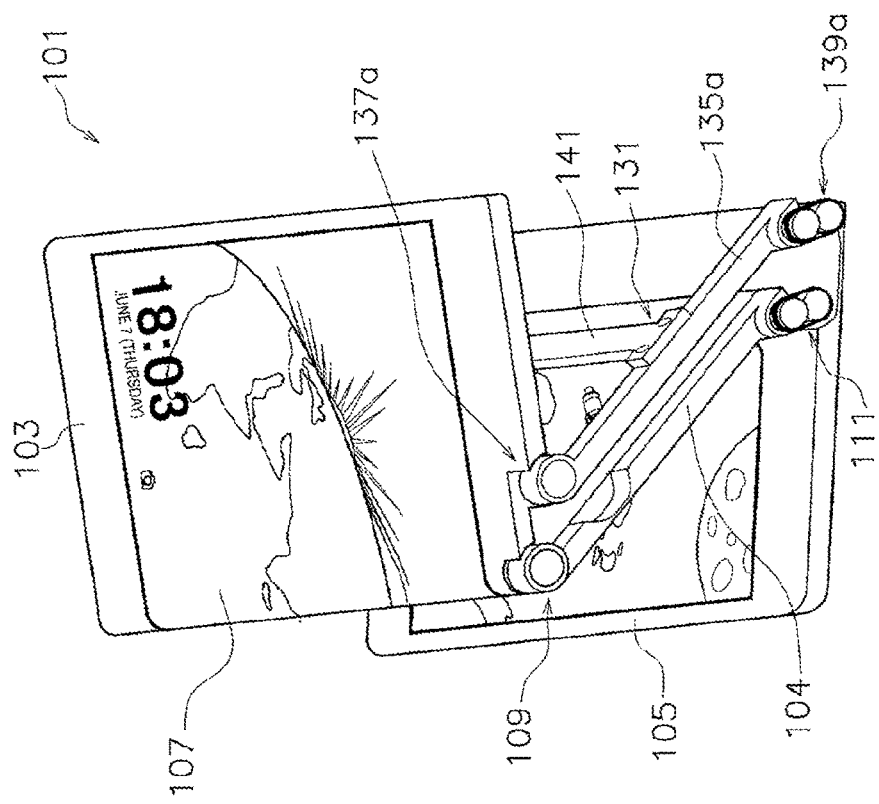
FIG. 25 is a perspective view of the mobile terminal (a second stage in the middle of bending).
Figure 26:
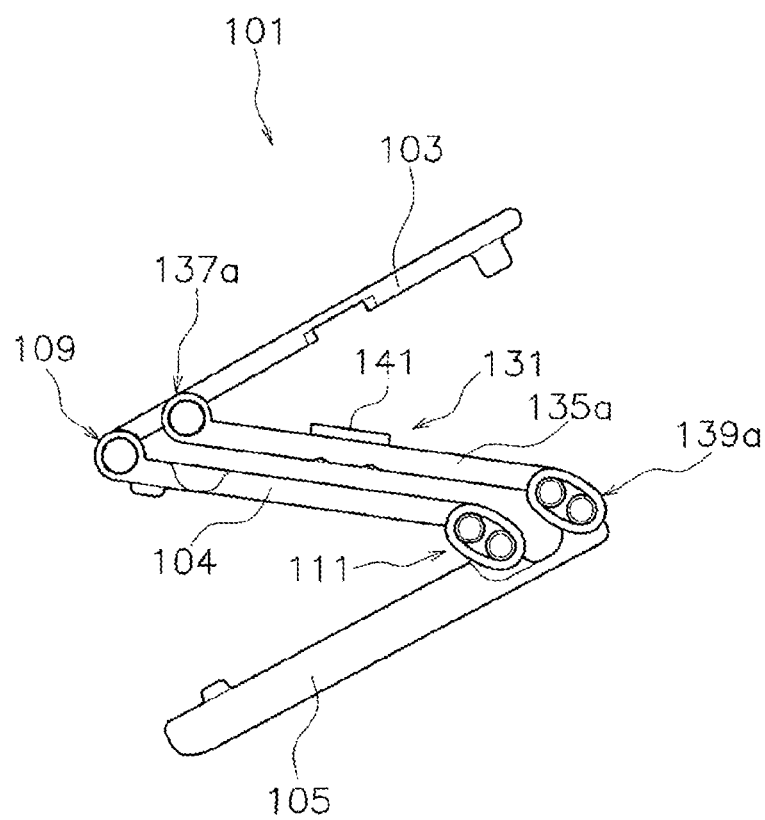
FIG. 26 is a side view of the mobile terminal (the second stage in the middle of bending).
Figure 27:
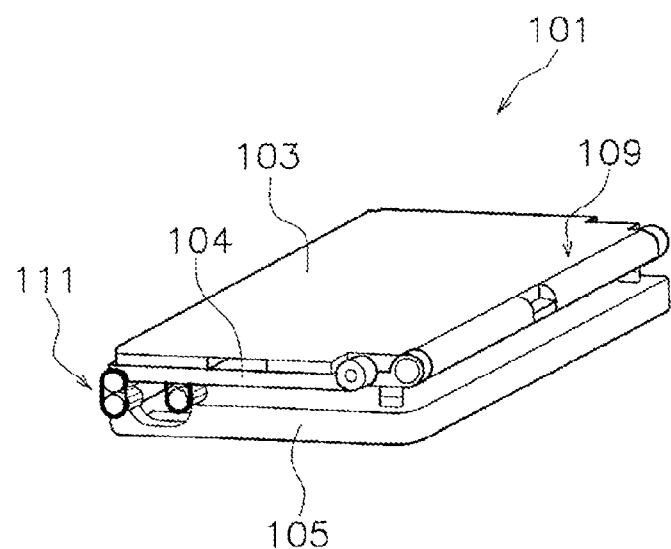
FIG. 27 is a perspective view of the mobile terminal (a folded state).

A mobile terminal 101 (one example of a foldable display device) according to the first embodiment will be described with reference to FIGS. 22 to 27. FIG. 22 is a plan view of a mobile terminal (an open planar state) of the second embodiment. FIG. 23 is a perspective view of the mobile terminal (a first stage in the middle of bending). FIG. 24 is a side view of the mobile terminal (a first stage in the middle of bending). FIG. 25 is a perspective view of the mobile terminal (a second stage in the middle of bending). FIG. 26 is a side view of the mobile terminal (the second stage in the middle of bending). FIG. 27 is a perspective view of the mobile terminal (a folded state). The mobile terminal 101 is a three-foldable (in a Z-shape) device, and is, for example, a smartphone, a tablet, a mobile phone, a gaming device, and an electronic book terminal.

The mobile terminal 101 includes a first chassis 103, a second chassis 104, a third chassis 105, the flexible display 107, a first pivot coupling portion 109, and a second pivot coupling portion 111.

The first chassis 103, the second chassis 104, and the third chassis 105 are flat plate-shaped members having a rectangular shape in plan view, and have approximately the same size in plan view. The first chassis 103, the second chassis 104, and the third chassis 105 have an internal space. Note that the first chassis 103 and the second chassis 104 have long sides close to each other, and the second chassis 104 and the third chassis 105 have long sides close to each other. Hereinafter, in FIG. 22, a direction in which the first chassis 103, the second chassis 104, and the third chassis 105 are arrayed is referred to as an "array direction", for example, the second chassis 104 side viewed from the first chassis 103 or the third chassis 105 is referred to as "inward in the array direction", and a side away from there is referred to as "outward in the array direction". Furthermore, a direction in which the long sides of the first chassis 103, the second chassis 104, and the third chassis 105 extend is referred to as a "long side extension direction".

The first pivot coupling portion 109 couples the long side inward in the array direction of the first chassis 103 and one long side of the second chassis 104. This allows an open state (a use state) in which the first chassis 103 and the second chassis 104 are opened to enter a planar state, and a closed state (a storage state) in which the first chassis 103 and the second chassis 104 are closed to enter a state of being bent outward.

The second pivot coupling portion 111 couples the other long side of the second chassis 104 and the long side inward in the array direction of the third chassis 105. This allows an open state (a use state) in which the second chassis 104 and the third chassis 105 are opened to enter a planar state, and a closed state (a storage state) in which the second chassis 104 and the third chassis 105 are closed to enter a state of being bent inward.

The first pivot coupling portion 109 includes a pair of hinges provided on both end portions of the first chassis 103 and the second chassis 104. The second pivot coupling portion 111 includes a pair of hinges provided on both end portions of the second chassis 104 and the third chassis 105.

As illustrated in FIG. 22, when the mobile terminal 101 is in the state developed in the planer state (use state), the first chassis 103, the second chassis 104, and the third chassis 105 are arranged so that the main surfaces are substantially flush.

As illustrated in FIG. 27, when the mobile terminal 101 is in a folded state, the first chassis 103 and the second chassis 104 are arranged so that the back surfaces face each other in close contact and the second chassis 104 and the third chassis 105 are arranged so that the main surfaces face each other in close contact.

The flexible display 107 is one seamless (unitary) piece and is mounted to cover the entire main surfaces of the first chassis 103, the second chassis 104, and the third chassis 105. In other words, the first chassis 103, the second chassis 104, and the third chassis 105 have sizes to support the entire back surface of the flexible display 107. The flexible display 107 is a flexible display, such as an organic EL, having a highly flexible paper structure, for example. The flexible display 107 may further include a touch panel.

The flexible display 107 is opened or bent, for example, following the opening/closing operations of the first chassis 103, the second chassis 104, and the third chassis 105. The flexible display 107 is bent outward between first chassis 103 and second chassis 104 in the folded state and bent inward between second chassis 104 and third chassis 105.

The flexible display 107 is arranged to cover the main surfaces of the first chassis 103, the second chassis 104, and the third chassis 105. The flexible display 107 includes a first adhesive portion 107a and a second adhesive portion 107b corresponding and further adhered to the first chassis 103 and the third chassis 105, respectively, and a non-adhesive portion 107c corresponding to but not adhered to the second chassis 104. Note that the first adhesive portion 107a and the second adhesive portion 107b are a part or all of portions corresponding to the first chassis 103 and the third chassis 105 in the flexible display 107, respectively.

(2) Opening/Closing Operation

In FIG. 22, the first chassis 103, the second chassis 104, and the third chassis 105 are in an open state, and the flexible display 107 has a planar shape.

In FIGS. 23 and 24, the first chassis 103, the second chassis 104, and the third chassis 105 are at a first stage in the middle of bending.

In FIGS. 25 and 26, the first chassis 103, the second chassis 104, and the third chassis 105 are at a second stage in the middle of bending.

In FIG. 27, the first chassis 103, the second chassis 104, and the third chassis 105 are in the folded state in which the first chassis 103, the second chassis 104, and the third chassis 105 are closed.

(3) Non-Adhesive Portion Support Mechanism

Figure 28:
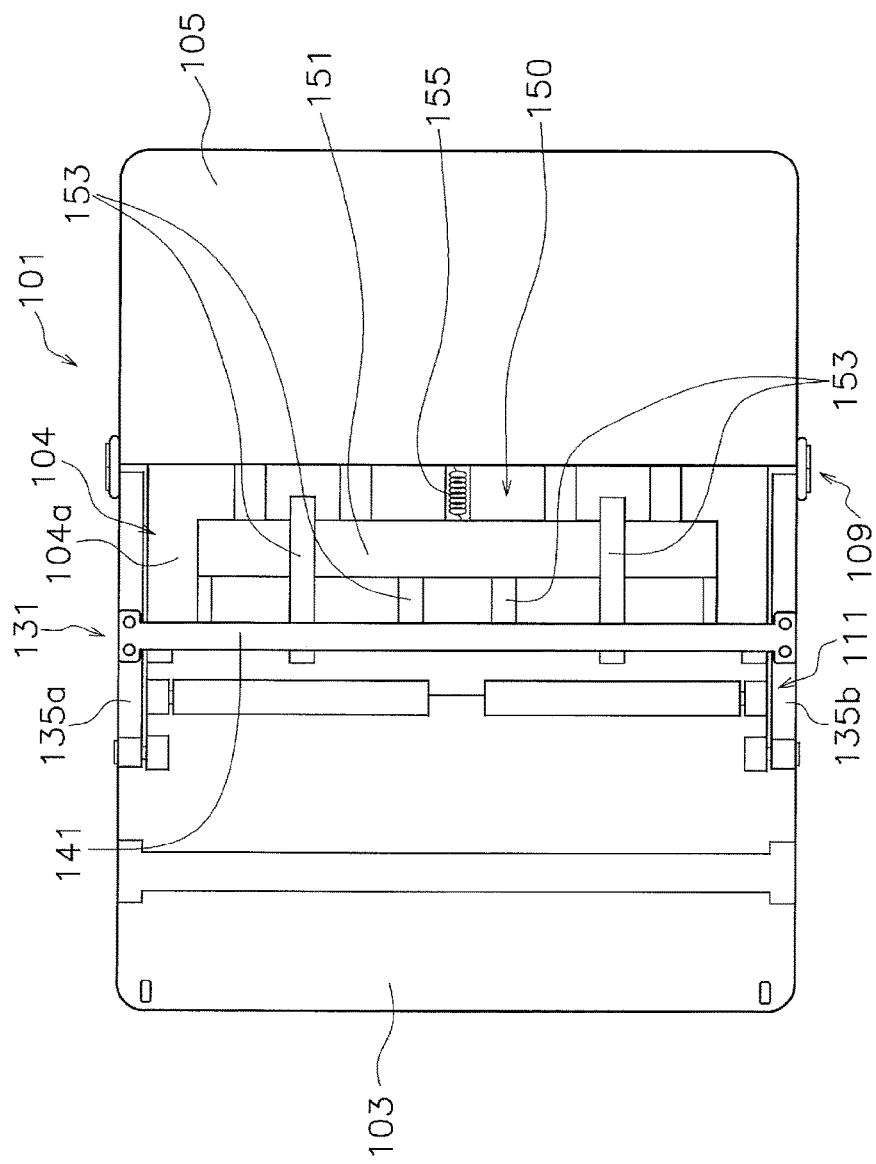
FIG. 28 is a plan view of a mobile terminal (an open planar state) (without a flexible display).
Figure 29:
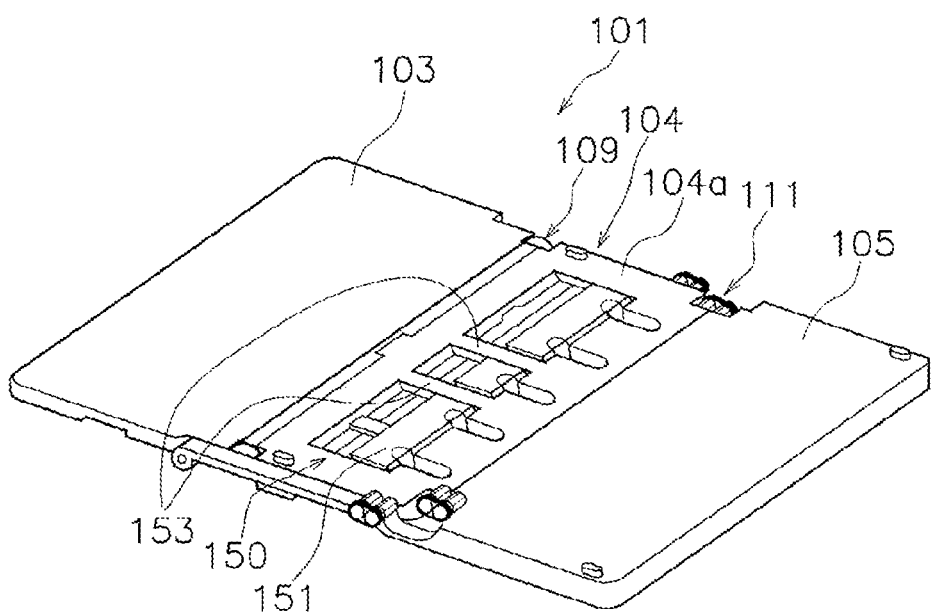
FIG. 29 is a perspective view of the mobile terminal (an open planar state) (without the flexible display).
Figure 30:
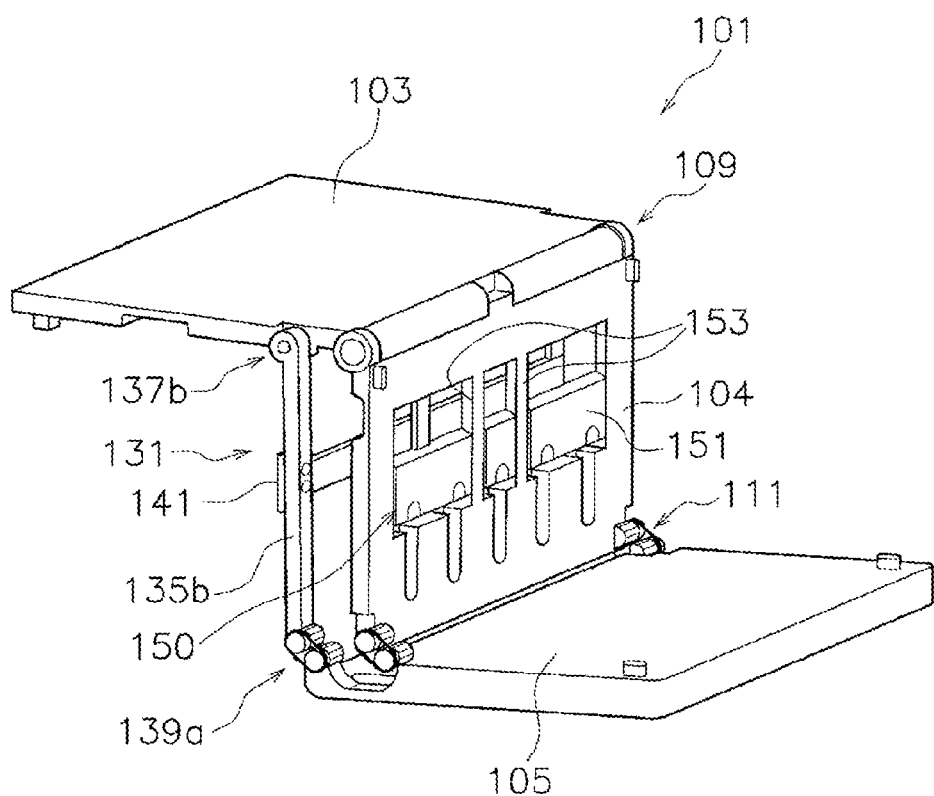
FIG. 30 is a perspective view of the mobile terminal (a first stage in the middle of bending) (without the flexible display).
Figure 31:
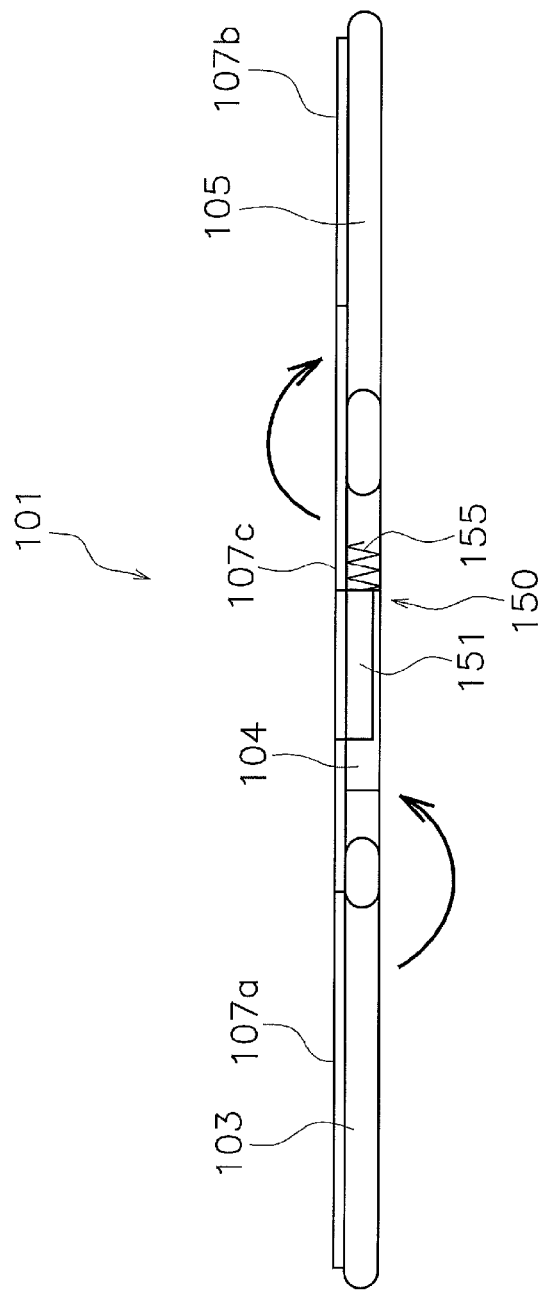
FIG. 31 is a schematic side view of the mobile terminal (an open planar state).
Figure 32:
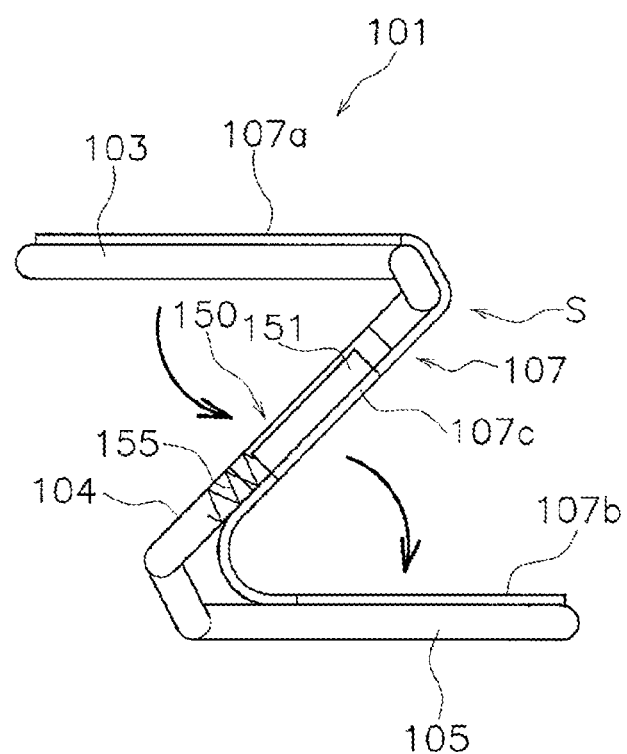
FIG. 32 is a schematic side view of the mobile terminal (a second stage in the middle of bending).
Figure 33:
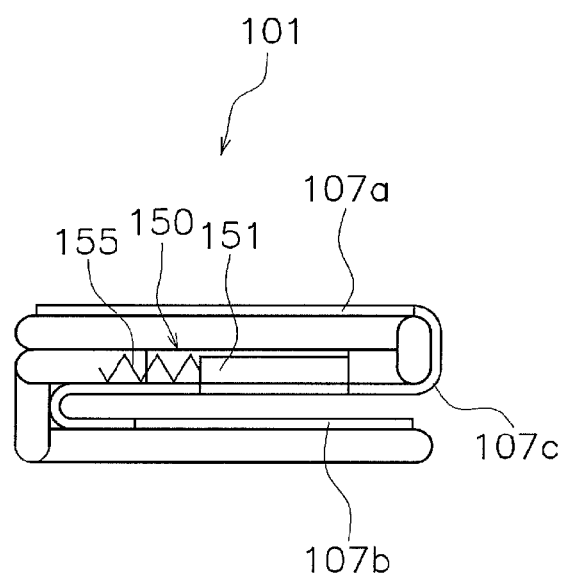
FIG. 33 is a schematic side view of the mobile terminal (a folded state).

A non-adhesive portion support mechanism 150 will be described with reference to FIGS. 28 to 33. FIG. 28 is a plan view of a mobile terminal (an open planar state) (without a flexible display). FIG. 29 is a perspective view of the mobile terminal (an open planar state) (without the flexible display). FIG. 30 is a perspective view of the mobile terminal (a first stage in the middle of bending) (without the flexible display). FIG. 31 is a schematic side view of the mobile terminal (an open planar state). FIG. 32 is a schematic side view of the mobile terminal (a second stage in the middle of bending). FIG. 33 is a schematic side view of the mobile terminal (a folded state).

As illustrated in FIGS. 28 to 30, the non-adhesive portion support mechanism 150 mainly includes a support slider 151 and guide members 153.

The support slider 151 (one example of a movement support member) is a member adhered to the non-adhesive portion 107c to support such that at least a part of the non-adhesive portion 107c becomes the planar state. The support slider 151 moves in the array direction in the second chassis 104 when the first chassis 103, the second chassis 104, and the third chassis 105 are opened and closed.

Specifically, the support slider 151 is a plate member that extends long in the long side extension direction. This structure widens a region in which the flexible display 107 is supported to the support slider 151 in the second chassis 104 portion.

The guide members 153 movably guide the support slider 151 between the first chassis 103 side and the third chassis 105 side in the second chassis 104. As a result, the movement of the support slider 151 is stabilized.

Specifically, the second chassis 104 includes a rectangular frame body 104*a* and a space 104*b* in the frame body 104*a*. The space 104*b* is a space for allowing the support slider 151 to move. In the space 104*b*, the guide members 153 are a plurality of thin plate members extending in the array direction, and fit to a plurality of grooves in both surfaces of the support slider 151. This allows the support slider 151 to move in the array direction without disengaging from the second chassis 104.

As illustrated in FIG. 28, the non-adhesive portion support mechanism 150 further includes a spring 155. The spring 155 couples the second chassis 104 and the support slider 151, and in the closed state in which the first chassis 103 and the second chassis 104 are closed and the flexible display 107 bends outward, the spring 155 biases the support slider 151 from the first pivot coupling portion 109 side toward the second pivot coupling portion 111 side. Thus, tension in the vicinity of the first pivot coupling portion 109 of the flexible display 107 is not high. As a result, sagging at the outer bent portion of the flexible display 107 is suppressed.

The details will be described further with reference to FIGS. 31 to 33.

In FIG. 31, the first chassis 103, the second chassis 104, and the third chassis 105 are in the open state, and the flexible display 107 has the planar shape.

In FIG. 32, the first chassis 103, the second chassis 104, and the third chassis 105 are at a stage in the middle of bending. At this time, although a pulling force acts on the non-adhesive portion 107*c* from the outer bent portion of the flexible display 107 in the first pivot coupling portion 109, since the spring 155 biases the support slider 151 and the non-adhesive portion 107*c* to the opposite side, sagging does not occur in the outer bent portion of the flexible display 107. Note that the spring can be omitted.

In FIG. 33, the first chassis 103, the second chassis 104, and the third chassis 105 are in the folded state in which the first chassis 103, the second chassis 104, and the third chassis 105 are closed. In this case as well, sagging does not occur in the outer bent portion of the flexible display 107.

(4) Link Mechanism

The mobile terminal 101 further includes a link mechanism 131 (one example of an angle adjustment mechanism). The link mechanism 131 is a mechanism to set an angle of the first chassis 103 and an angle of the third chassis 105 with respect to the second chassis 104 always to be the same.

The link mechanism 131 includes a first link member 135*a* and a second link member 135*b*. The first link member 135*a* and the second link member 135*b* couple the first chassis 103 and the third chassis 105 such that the angle of the first chassis 103 and the angle of the third chassis 105 with respect to the second chassis 104 are always to be the same.

Specifically, the first link member 135*a* has one end at an end portion in the long side extension direction of the first chassis 103 coupled to a position outward in the arranged direction with respect to the first pivot coupling portion 109 by a first pivot portion 137*a*. Further, the first link member 135*a* has the other end at an end portion in the long side extension direction of the second chassis 104 coupled to a position inward in the arranged direction with respect to the second pivot coupling portion 111 with a second pivot portion 139*a*.

The second link member 135*b* is same as the first link member 135*a*.

The link mechanism 131 includes a coupling member 141. The coupling member 141 couples the first link member 135*a* and the second link member 135*b*. Specifically, the coupling member 141 is a thin plate extending in the long side extension direction.

As illustrated in FIGS. 23 to 27, the angle of the first chassis 103 and the angle of the third chassis 105 with respect to the second chassis 104 are always to be the same by the link mechanism 131.

Thus, an amount of extrusion and an amount of retraction during the folding operation of the flexible display 7 are the same. As a result, a large compressive stress or tensile stress does not occur in the flexible display 7.

Furthermore, the link mechanism 131 allows the first chassis 103 and the second chassis 104, and further the second chassis 104 and the third chassis 105 to be bent only in the intended direction.

(5) Seventh Modified Example

Figure 34:
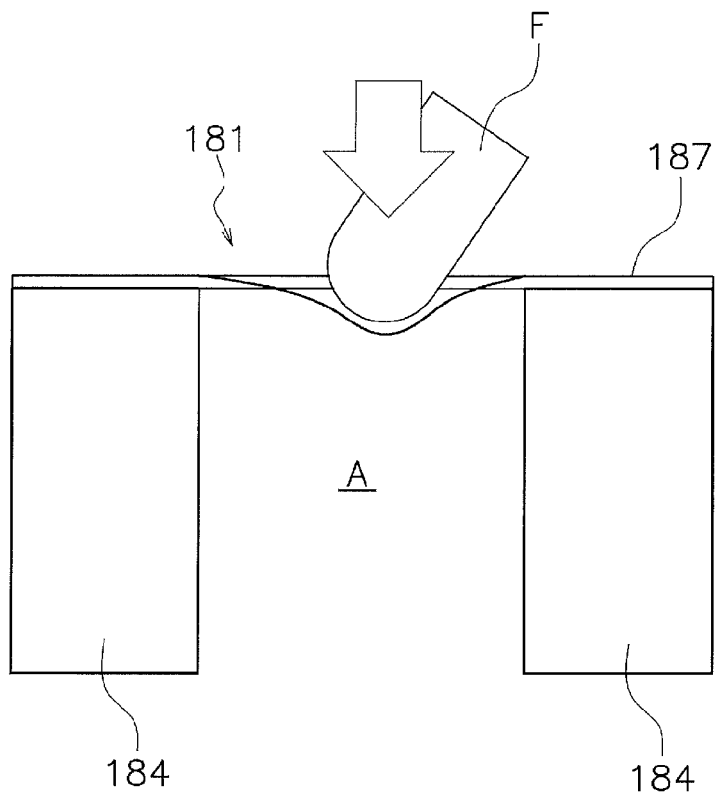
FIG. 34 is a schematic side view illustrating a deflection of a general flexible display.
Figure 35:
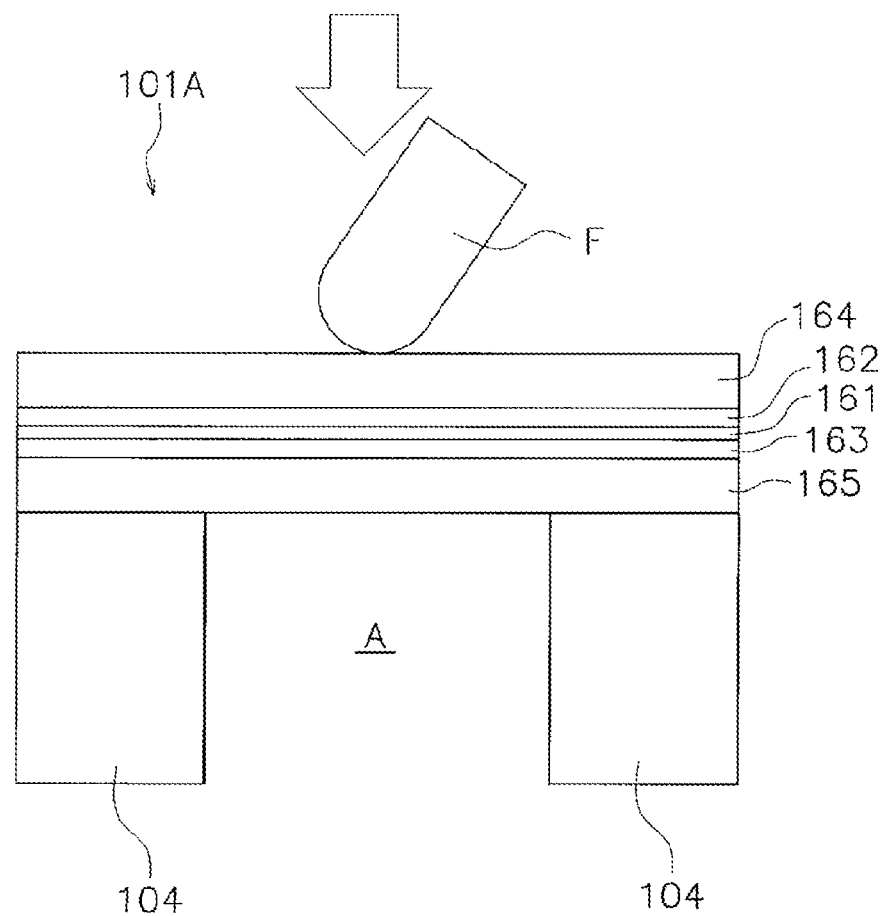
FIG. 35 is a schematic side view of a mobile terminal (a folded state) of a seventh modified example.

As a modified example of the second embodiment, the seventh modified example will be described with reference to FIGS. 34 and 35. FIG. 34 is a schematic side view illustrating a deflection of a general flexible display. FIG. 35 is a schematic side view of a mobile terminal (a folded state) of the seventh modified example.

Note that basic structures of the following seventh to twelfth modified examples are the same as that of the second embodiment. Thus, the common points are simplified or omitted.

The non-adhesive portion 107*c* of the flexible display 107 is supported by the support member 11 in the first embodiment and by the support slider 151 in the second embodiment. Reducing the support areas by these members or eliminating the support member itself is preferred.

On the other hand, when the support area of the flexible display 107 is reduced or the support is eliminated as described above, the following problems are conceived. As illustrated in FIG. 34, as a general description, in a case where a flexible display 187 (with a touch panel) supported by chassis 184 at a mobile terminal 181 is thin, as illustrated in the drawing, the flexible display 187 may be deflected by an operation with a finger F without a support member on the lower side. In that case, the deflection possibly damages the flexible display 187. Furthermore, the appearance is not preferable.

Therefore, in the seventh modified example illustrated in FIG. 35, a mobile terminal 101A includes a flexible display sandwiched between reinforcement films having a certain amount of thickness to increase the overall thickness. In this case, rigidity at which the deflection does not occur even when pressure is applied can be ensured.

Note that the reinforcing films preferably have the same thickness so that a pulling force or a compressive force does not act on the flexible display when the flexible display bends at the pivot coupling portion.

Specifically, in the mobile terminal 101A, a flexible display 161 is provided on second chassis 104A. Respective first reinforcing film 164 and second reinforcing film 165 are adhered to both surfaces of the flexible display 161 via adhesive layers 162, 163, respectively.

As a result, even when there is space A below the flexible display 161, a deflection is less likely to occur even when the finger F presses against the flexible display 161.

This modified example is also effective to the first embodiment.

(6) Eighth Modified Example

Figure 36:
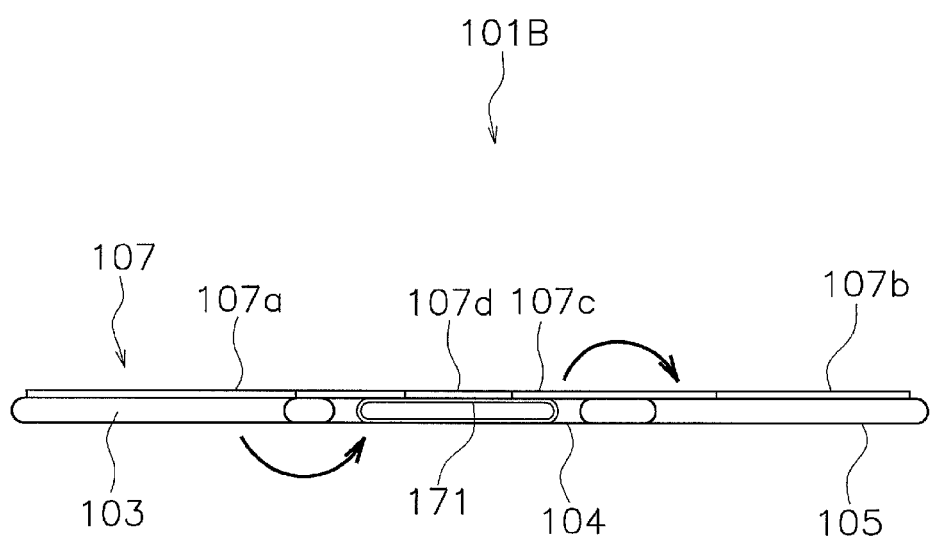
FIG. 36 is a schematic side view of a mobile terminal (an open planar state) of an eighth modified example.
Figure 37:
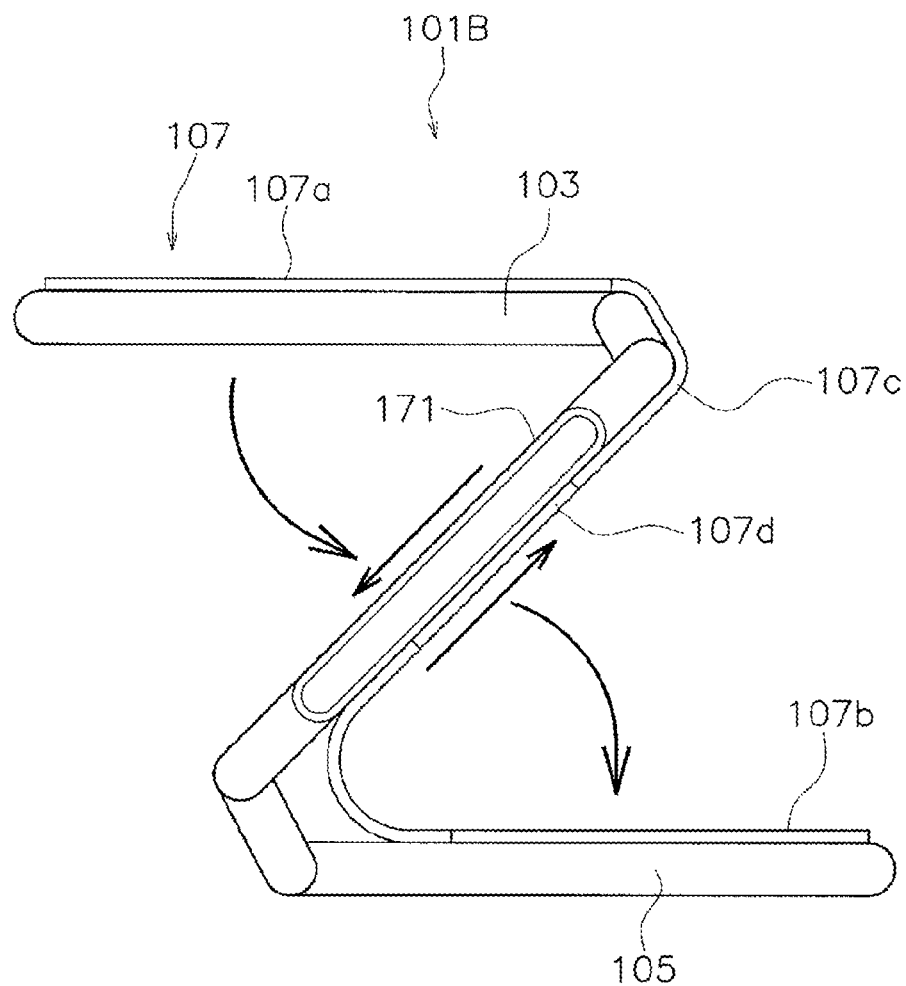
FIG. 37 is a schematic side view of a mobile terminal (a second stage in the middle of bending) of the eighth modified example.
Figure 38:
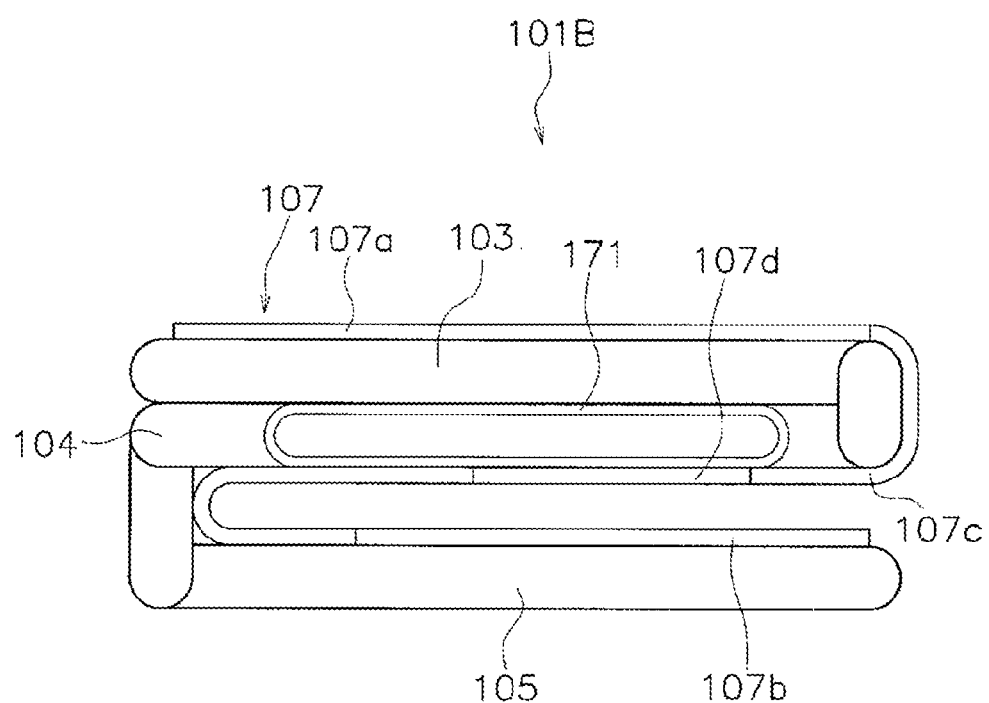
FIG. 38 is a schematic side view of the mobile terminal (a folded state) of the eighth modified example.

As a modified example of the second embodiment, the eighth modified example will be described with reference to FIGS. 36 to 38. FIG. 36 is a schematic side view of a mobile terminal (an open planar state) of the eighth modified example. FIG. 37 is a schematic side view of the mobile terminal (the second stage in the middle of bending) of the eighth modified example. FIG. 38 is a schematic side view of the mobile terminal (a folded state) of the eighth modified example.

This embodiment is a structure in which a space is not formed or is small under the non-adhesive portion 107c of the flexible display 107 in the second chassis 104. This eliminates the need for a support slider.

Specifically, a mobile terminal 101B includes an endless film 171 (one example of a movement support member) inside the second chassis 104. A part of the film 171 is fixed to a fixing portion 107d, which is a part of the non-adhesive portion 107c of the flexible display 107. The film 171 moves while rotating in association with the movement in the array direction of the non-adhesive portion 107c inside the second chassis 104.

The details will be further described with reference to FIGS. 36 to 38.

In FIG. 36, the first chassis 103, the second chassis 104, and the third chassis 105 are in an open state, and the flexible display 107 has the planar shape. In this state, the film 171 supports the non-adhesive portion 107c of the flexible display 107 from below.

In FIG. 37, the first chassis 103, the second chassis 104, and the third chassis 105 are at a stage in the middle of bending. At this time, the film 171 moves in the array direction inside the second chassis 104 while rotating while being pulled by the non-adhesive portion 107c of the flexible display 107.

In FIG. 38, the first chassis 103, the second chassis 104, and the third chassis 105 are in the folded state in which the first chassis 103, the second chassis 104, and the third chassis 105 are closed.

(7) Ninth Modified Example

Figure 39:
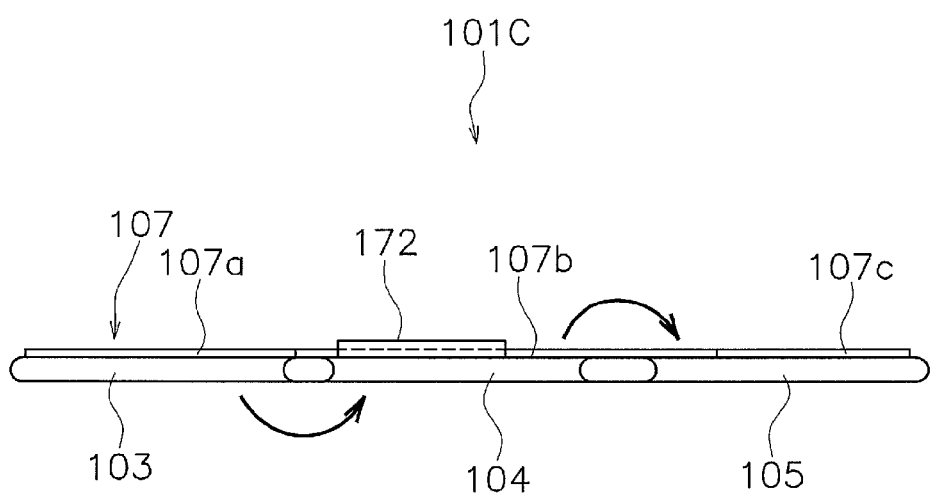
FIG. 39 is a schematic side view of a mobile terminal (an open planar state) of a ninth modified example.
Figure 40:
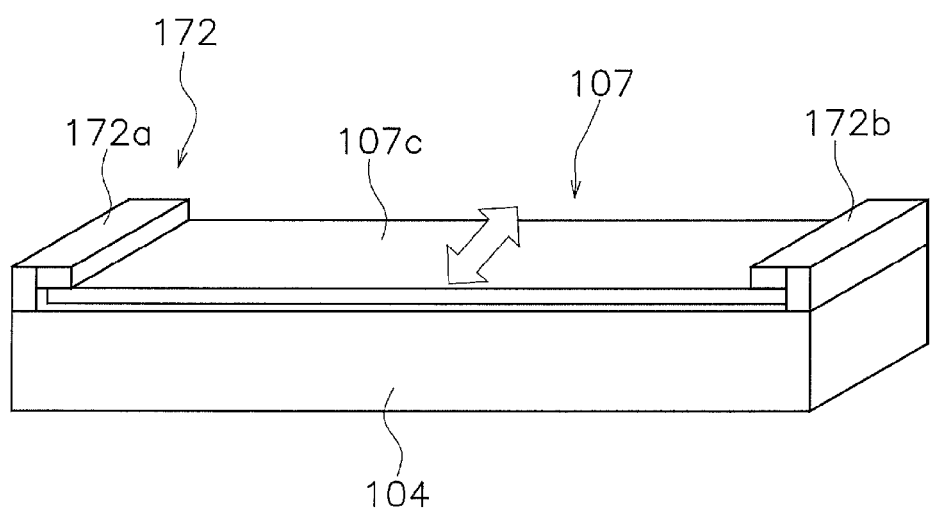
FIG. 40 is a schematic perspective view illustrating the flexible display and guide portions.
Figure 41:
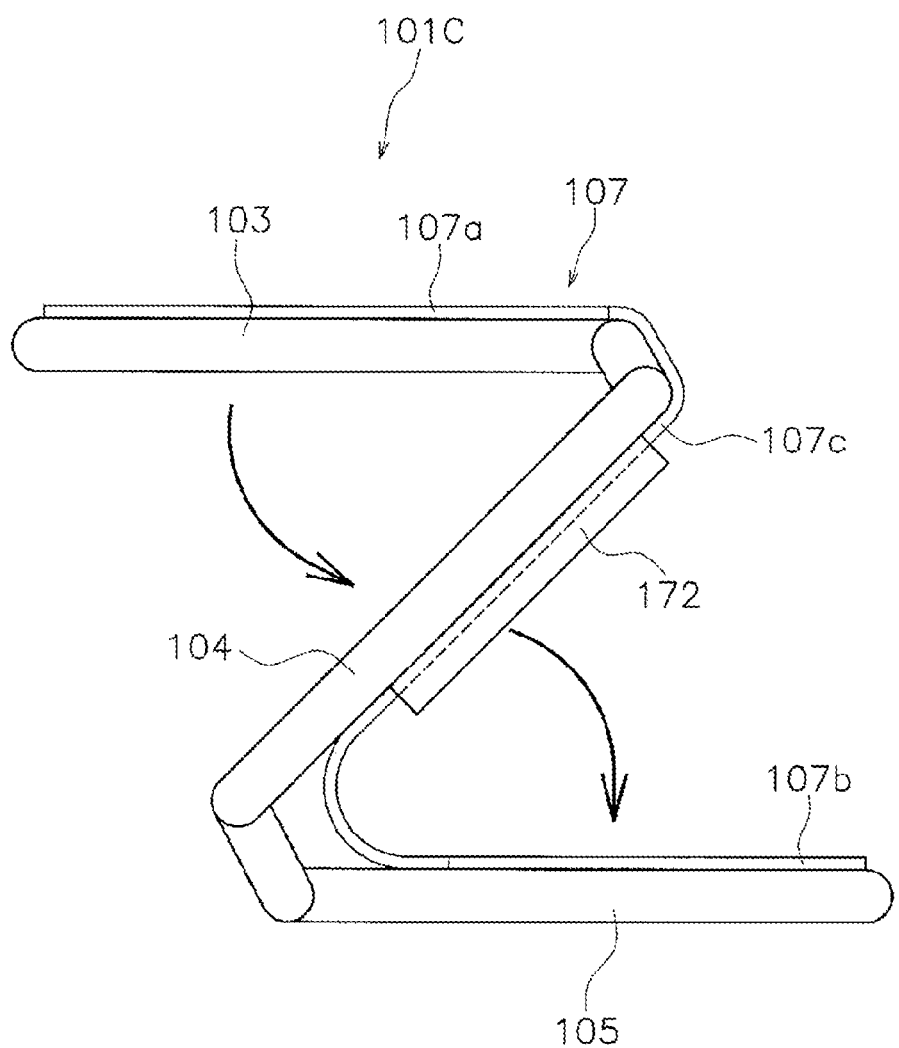
FIG. 41 is a schematic side view of the mobile terminal (a second stage in the middle of bending) of the ninth modified example.
Figure 42:
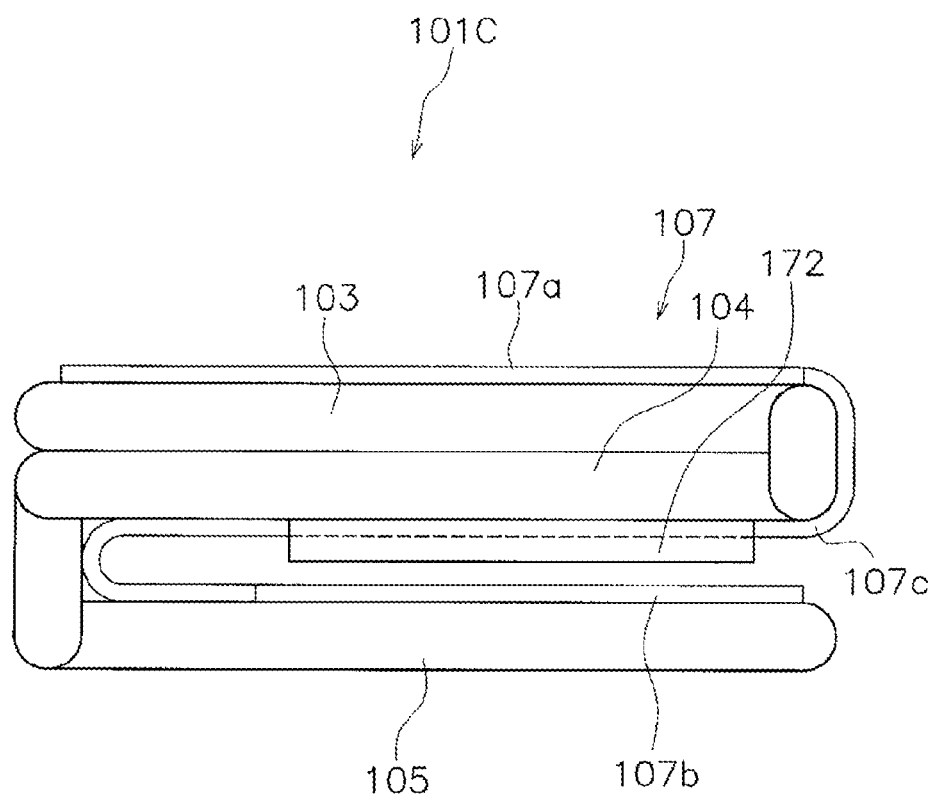
FIG. 42 is a schematic side view of the mobile terminal (a folded state) of the ninth modified example.

As a modified example of the second embodiment, the ninth modified example will be described with reference to FIGS. 39 to 42. FIG. 39 is a schematic side view of a mobile terminal (an open planar state) of the ninth modified example. FIG. 40 is a schematic perspective view illustrating a flexible display and guide portions. FIG. 41 is a schematic side view of the mobile terminal (a second stage in the middle of bending) of the ninth modified example. FIG. 42 is a schematic side view of the mobile terminal (a folded state) of the ninth modified example.

As illustrated in FIGS. 39 and 40, a mobile terminal 101C includes guide portions 172. The guide portions 172 are provided on the second chassis 104. Specifically, the guide portions 172 are provided as a first guide portion 172A and a second guide portion 172B at both ends in the long side extension direction of the second chassis 104 to guide the non-adhesive portion 107c of the flexible display 107 in the array direction. More specifically, the guide portions 172 cover the upper sides of both ends in the long side extension direction of the non-adhesive portion 107c.

The details will be further described with reference to FIGS. 39 to 41.

In FIG. 39, the first chassis 103, the second chassis 104, and the third chassis 105 are in the open state, and the flexible display 107 has the planar shape.

In FIG. 40, the first chassis 103, the second chassis 104, and the third chassis 105 are at a stage in the middle of bending. At this time, the non-adhesive portion 107c of the flexible display 107 moves in the array direction while being guided by the guide portions 172.

In FIG. 41, the first chassis 103, the second chassis 104, and the third chassis 105 are in the folded state in which the first chassis 103, the second chassis 104, and the third chassis 105 are closed.

(8) Tenth Modified Example

Figure 43:
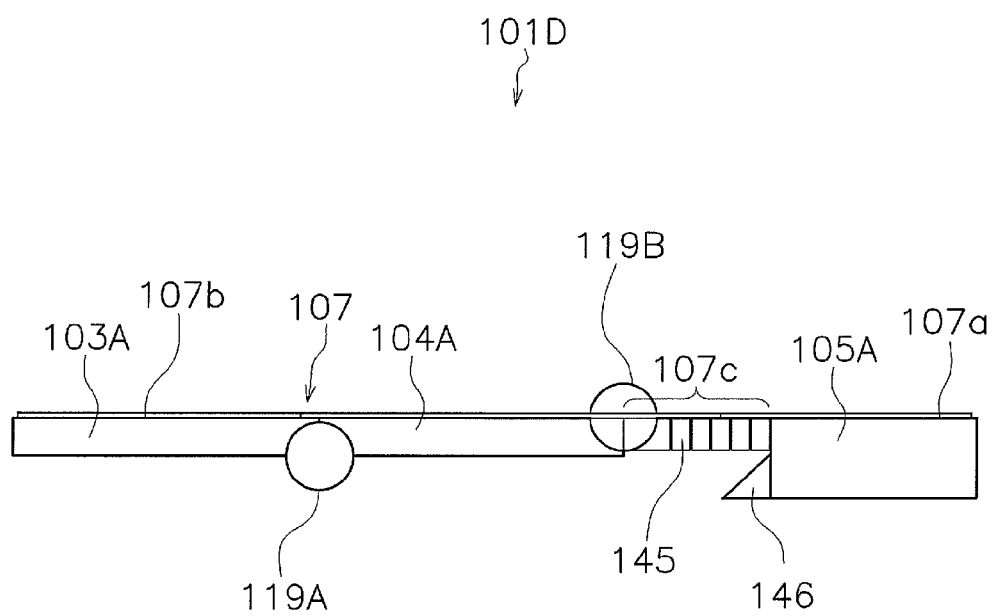
FIG. 43 is a schematic side view of a mobile terminal (an open planar state) of a tenth modified example.
Figure 44:
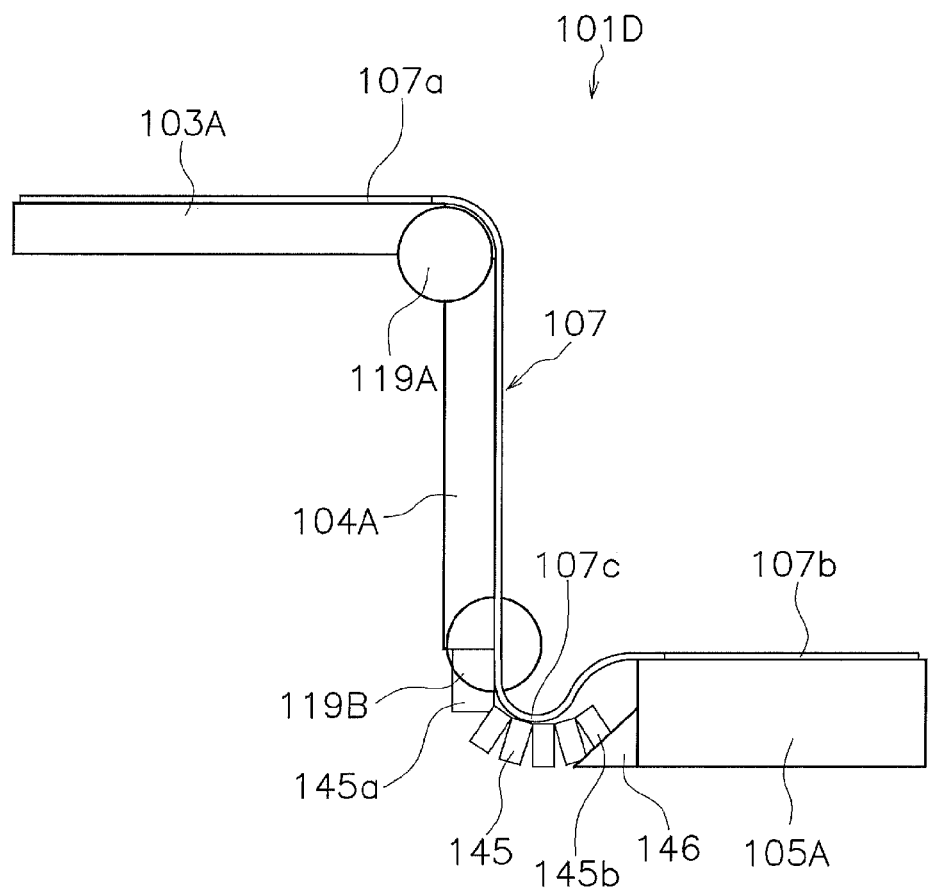
FIG. 44 is a schematic side view of the mobile terminal (a second stage in the middle of bending) of the tenth modified example.
Figure 45:
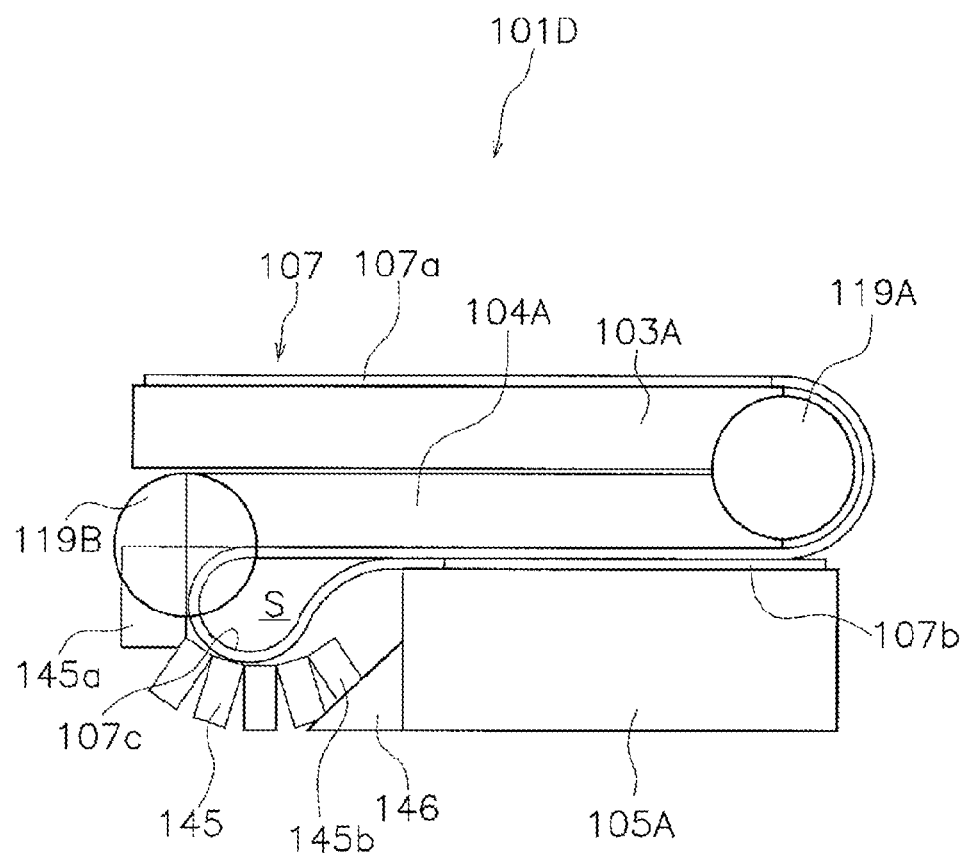
FIG. 45 is a schematic side view of the mobile terminal (a folded state) of the tenth modified example.

As a modified example of the second embodiment, the tenth modified example will be described with reference to FIGS. 43 to 45. FIG. 43 is a schematic side view of a mobile terminal (an open planar state) of the tenth modified example. FIG. 44 is a schematic side view of the mobile terminal (a second stage in the middle of bending) of the tenth modified example. FIG. 45 is a schematic side view of the mobile terminal (a folded state) of the tenth modified example.

In FIG. 43, a mobile terminal 101D is in an open use state. In other words, a first chassis 103A, a second chassis 104A, and a third chassis 105A are in the open state, and a flexible display 107A has a planar shape.

The third chassis 105A has both ends on the second chassis 104A side in the long side extension direction extend toward the first chassis 103A and are pivotably coupled, and the long side in the array direction of the third chassis 105A is arranged to be separated from the long side inward in the array direction of the second chassis 104A in the arranged direction.

The mobile terminal 101D includes a bellows member 145. The bellows member 145 extends further from the second chassis 104A to the third chassis 105A side to support the non-adhesive portion 107c of the flexible display 107 from below. The bellows member 145 has a first end 145a in the array direction that abuts on or approaches a long side of the second chassis 104A to be supported, and a second end 145b in the array direction that abuts on or approaches the long side inward in the arranged direction of the third chassis 105A to be supported.

The third chassis 105A includes a support member 146 having an inclined support surface in side view at the lower portion inward in the array direction.

As illustrated in FIG. 44, when the mobile terminal 101D is folded, the non-adhesive portion 107c of the flexible display 107 is bent between the second chassis 104A and the third chassis 105A. At this time, the bellows member 145 covering the bent portion of the non-adhesive portion 107c of the flexible display 107 is bent while the second end 145b in the array direction is supported to the inclined surface of the support member 146.

As illustrated in FIG. 45, when the mobile terminal 101D is folded, the non-adhesive portion 107c of the flexible display 107 enters the most bent state, and further the bellows member 145 is maintained in the state of covering the non-adhesive portion 7c. Note that the second end 145b in the array direction of the bellows member 145 is supported to the inclined surface of the support member 146. Further, at this timing, the first end 145a in the array direction of the bellows member 145 is separated from the long side of the second chassis 105A.

In this embodiment, in the folded state, the bellows member 145 falls within the thickness range of the third chassis 105A and does not increase the thickness of the terminal. Additionally, the bellows member 145 ensures the space S that stores the non-adhesive portion 107c of the flexible display 107 in the bent state, and further the space is covered with the bellows member 145.

As illustrated in FIG. 45, by storing the non-adhesive portion 107c in the space S, a radius of curvature of the non-adhesive portion 107c becomes large, thereby reducing tension. Therefore, even when the number of times of bending of the second chassis 104A and the third chassis 105A increases, damage or deterioration of the bent portion of the flexible display 107 is unlikely to occur.

Furthermore, in this embodiment, the flat surface is maintained without, for example, a protrusion on the back surface side (the upper side in the drawing) inward in the array direction of the second chassis 104A. Thus, the overall thickness of the mobile terminal 101D when the mobile terminal 101D is folded can be reduced.

Note that another elastically deformable member (for example, a rubber member) may be used instead of the bellows member.

(9) Eleventh Modified Example

Figure 46:
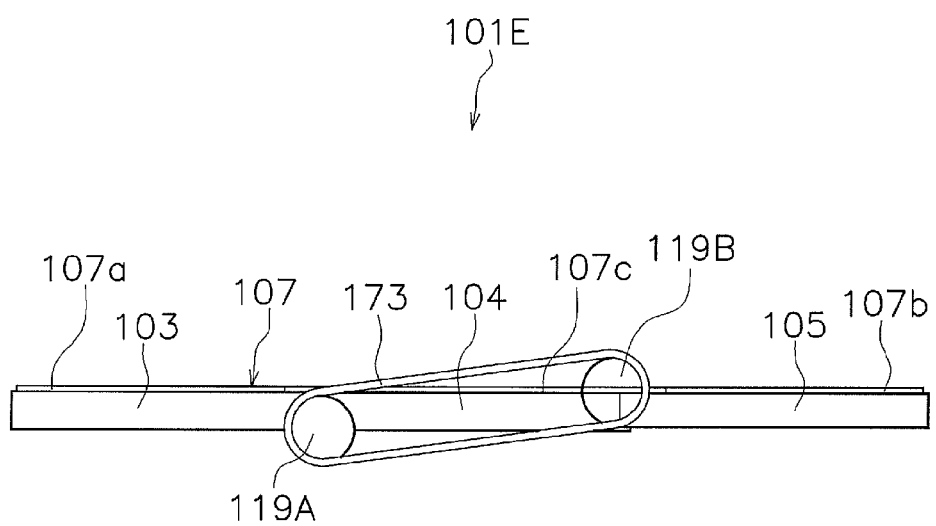
FIG. 46 is a schematic side view of a mobile terminal (an open planar state) of an eleventh modified example.
Figure 47:
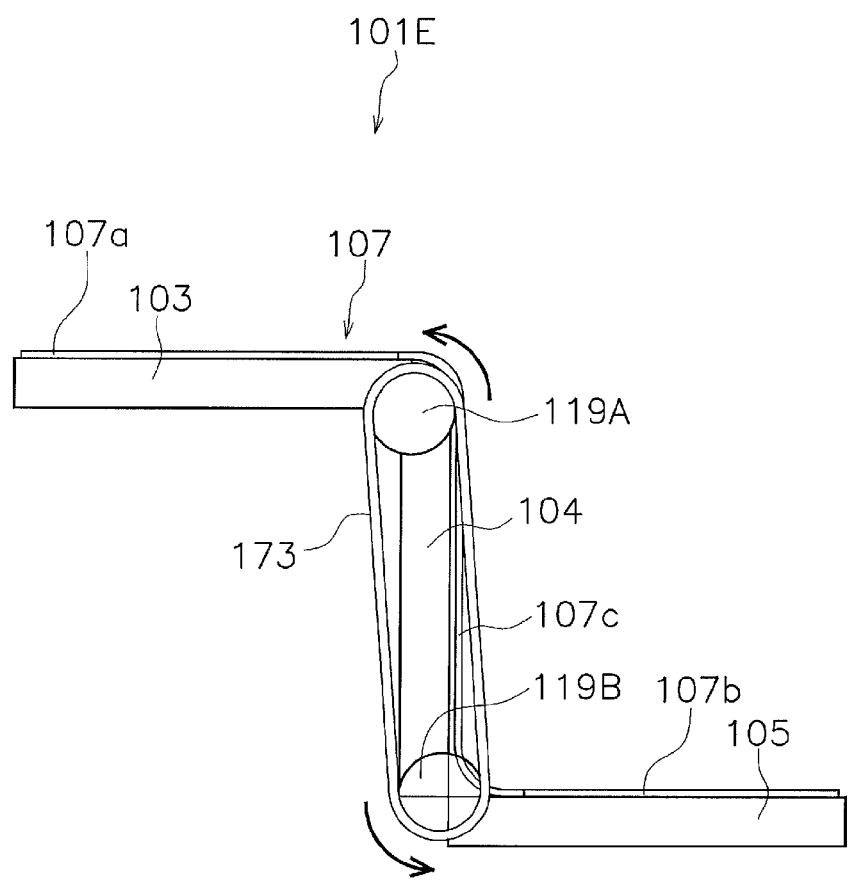
FIG. 47 is a schematic side view of the mobile terminal (a second stage in the middle of bending) of the eleventh modified example.
Figure 48:
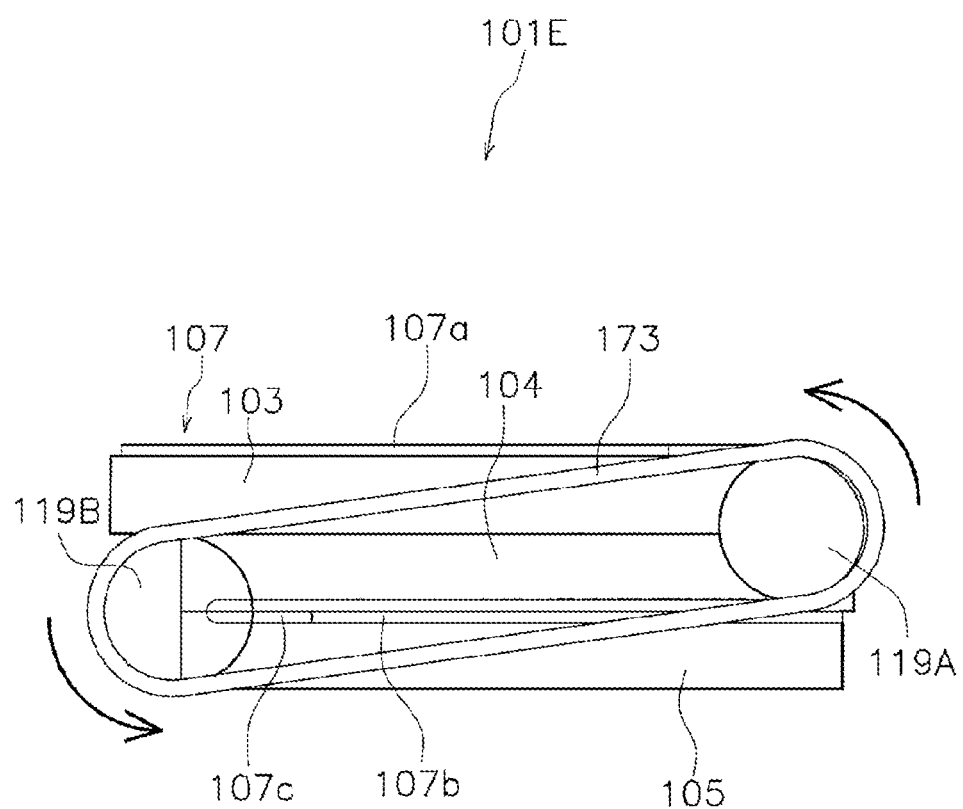
FIG. 48 is a schematic side view of the mobile terminal (a folded state) of the eleventh modified example.

As a modified example of the second embodiment, the eleventh modified example will be described with reference to FIGS. 46 to 48. FIG. 46 is a schematic side view of a mobile terminal (an open planar state) of the eleventh modified example. FIG. 47 is a schematic side view of the mobile terminal (a second stage in the middle of bending) of the eleventh modified example. FIG. 48 is a schematic side view of the mobile terminal (a folded state) of the eleventh modified example.

A mobile terminal 101E includes an endless belt 173 (one example of an angle adjustment mechanism). The belt 173 is wound around a first hinge 119A and a second hinge 119B. The first hinge 119A is a member non-pivotably coupled to the first chassis 103. The second hinge 119B is a member non-pivotably coupled to the third chassis 105.

Pivot angles of the first hinge 119A and the second hinge 119B (that is, angles of the first chassis 103 and the third chassis 105 with respect to the second chassis 104) are matched to be the same with the belt 173. Thus, an amount of extrusion and an amount of retraction during the folding operation of the flexible display 107 are the same. As a result, a large compressive stress or tensile stress does not occur in the flexible display 107.

The details will be further described with reference to FIGS. 46 to 48.

In FIG. 46, the first chassis 103, the second chassis 104, and the third chassis 105 are in an open state, and the flexible display 107 has the planar shape.

In FIG. 47, the first chassis 103, the second chassis 104, and the third chassis 105 are at a stage in the middle of bending. The angles of the first chassis 103 and the third chassis 105 with respect to the second chassis 104 are matched to be the same with the belt 173. Thus, the amount of extrusion and the amount of retraction during the folding operation of the flexible display 107 are the same.

In FIG. 48, the first chassis 103, the second chassis 104, and the third chassis 105 are in the folded state in which the first chassis 103, the second chassis 104, and the third chassis 105 are closed.

(10) Twelfth Modified Example

Figure 49:
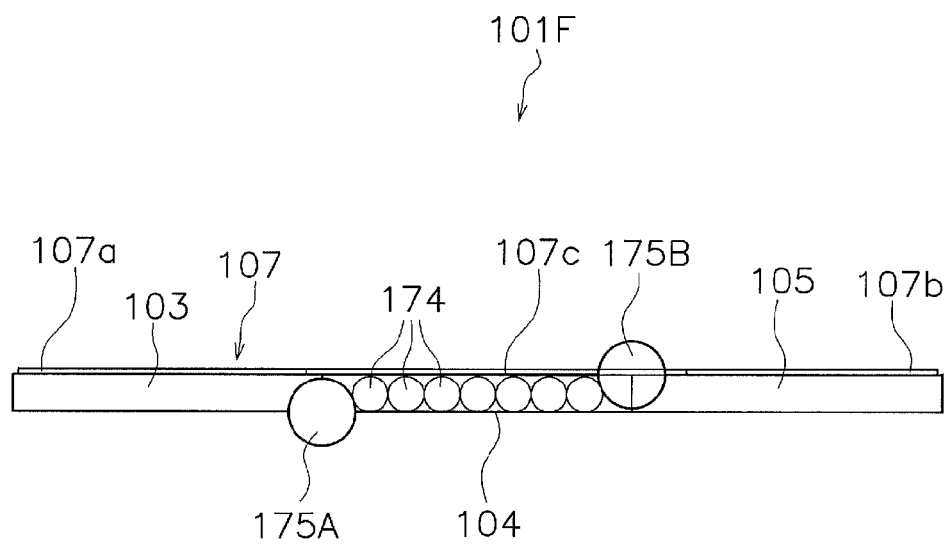
FIG. 49 is a schematic side view of a mobile terminal (an open planar state) of a twelfth modified example.
Figure 50:
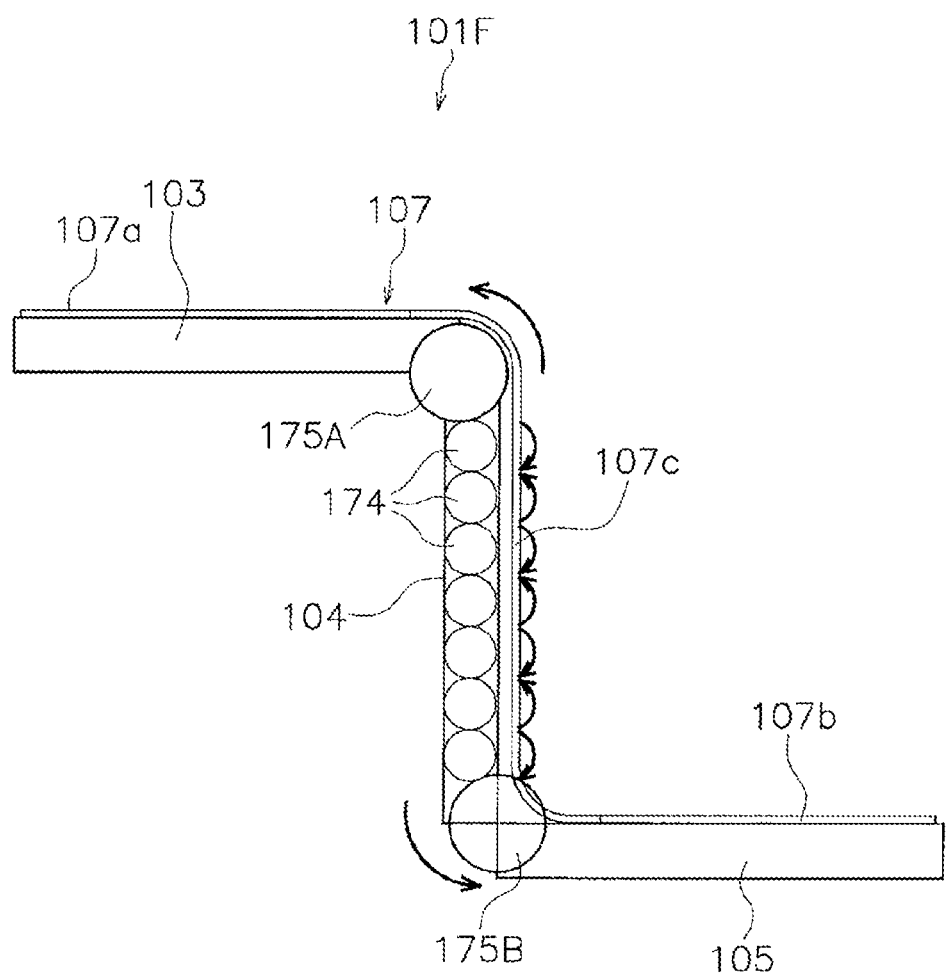
FIG. 50 is a schematic side view of the mobile terminal (a second stage in the middle of bending) of the twelfth modified example.
Figure 51:
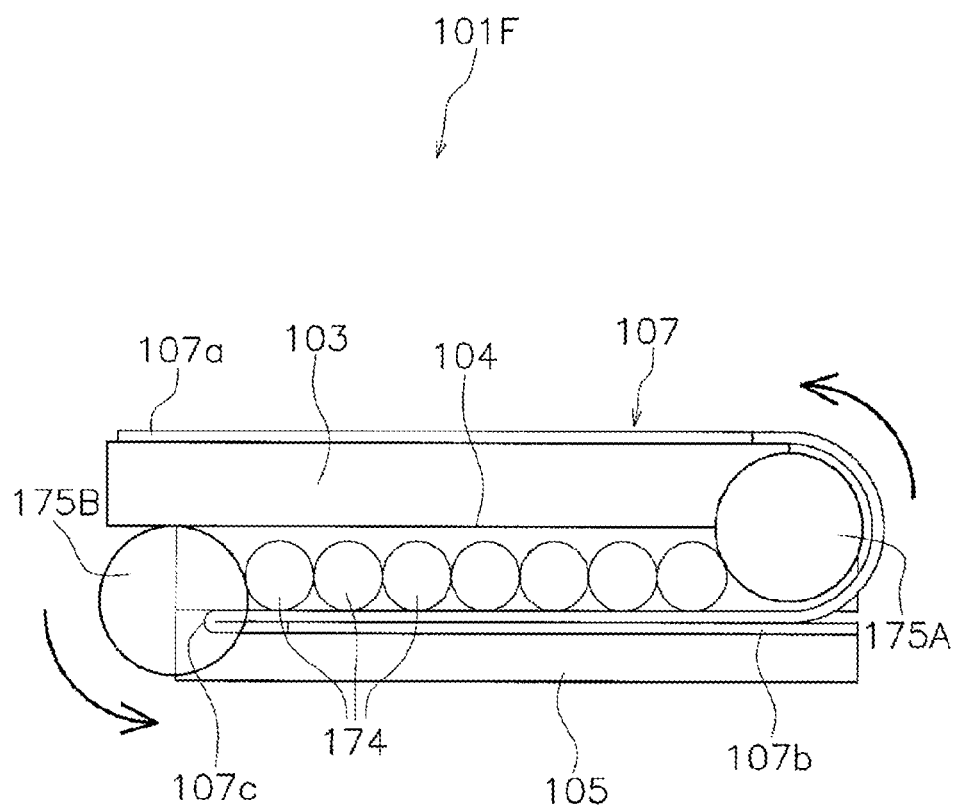
FIG. 51 is a schematic side view of the mobile terminal (a folded state) of the twelfth modified example.

As a modified example of the second embodiment, the twelfth modified example will be described with reference to FIGS. 49 to 51. FIG. 49 is a schematic side view of a mobile terminal (an open planar state) of the twelfth modified example. FIG. 50 is a schematic side view of the mobile terminal (a second stage in the middle of bending) of the twelfth modified example. FIG. 51 is a schematic side view of the mobile terminal (a folded state) of the twelfth modified example.

A mobile terminal 101F includes a plurality of gears 174 (one example of an angle adjustment mechanism) arranged in the array direction on a lateral side of the second chassis 104. The plurality of gears 174 mesh with each other, and the gears 174 at both ends mesh with gears provided on a first hinge 175A and a second hinge 175B. The first hinge 175A is a member non-pivotably coupled to the first chassis 103. The second hinge 175B is a member non-pivotably coupled to the third chassis 105.

Rotation angles of the first hinge 175A and the second hinge 175B (that is, angles of the first chassis 103 and the third chassis 105 with respect to the second chassis 104) are matched to be the same with the plurality of gears 174. Thus, the amount of extrusion and the amount of retraction during the folding operation of the flexible display 107 are the same. As a result, a large compressive stress or tensile stress does not occur in the flexible display 107.

The details will be further described with reference to FIGS. 49 to 51.

In FIG. 49, the first chassis 103, the second chassis 104, and the third chassis 105 are in an open state, and the flexible display 107 has the planar shape.

In FIG. 50, the first chassis 103, the second chassis 104, and the third chassis 105 are at a stage in the middle of bending. The angles of the first chassis 103 and the third chassis 105 with respect to the second chassis 104 are matched to be the same with the plurality of gears 174. Thus, the amount of extrusion and the amount of retraction during the folding operation of the flexible display 107 are the same.

In FIG. 51, the first chassis 103, the second chassis 104, and the third chassis 105 are in the folded state in which the first chassis 103, the second chassis 104, and the third chassis 105 are closed.

3. Other Embodiments

Although the plurality of embodiments of the present disclosure have been described as above, the present disclosure is not limited to the above-described embodiments, and various modifications are possible without departing from the gist of the invention. In particular, the plurality of embodiments and modified examples described herein can be combined arbitrarily with one another as necessary.

INDUSTRIAL APPLICABILITY

The present disclosure is broadly applicable to foldable display devices.

BRIEF DESCRIPTION OF THE REFERENCE NUMERALS

1: Mobile terminal
3: First chassis
5: Second chassis
7: Flexible display
7a: Adhesive portion
7b: Adhesive portion
7c: Non-adhesive portion
9: Pivot coupling unit 9a: Hinge
9b: Hinge
11: Support member
13: Support body
13a: Flat support surface
13b: Curved surface
15: Locking member

The invention claimed is:

1. A foldable display device in which a plurality of chassis are foldably coupled, comprising:
   a first chassis;
   a second chassis;
   a pivot coupling portion that couples the first chassis and the second chassis to position the first chassis and the second chassis to an open state and a closed state, the first chassis and the second chassis being open to enter a planar state in the open state, the first chassis and the second chassis being closed to enter a state of being bent inward in the closed state;
   a flexible display arranged to cover surfaces of the first chassis and the second chassis, wherein the display is in the open state and the closed state in accordance with the first chassis and the second chassis; and
   a support member arranged between the first chassis and the second chassis, the support member having a flat support surface that supports the display when the display is in the open state,
   wherein the display includes adhesive portions and a non-adhesive portion, the adhesive portions are adhered to the first chassis and the second chassis, and the non-adhesive portion is separable from the flat support surface of the support member between the first chassis and the second chassis,
   wherein the non-adhesive portion of the display bends at a position away from the flat support surface in an upward direction when the display is in the closed state; and
   wherein the support member has a first curved surface and a second curved surface corresponding to portions of a circular arc around the pivot center of the pivot coupling portion when viewed in a direction in which a pivot axis of the pivot coupling portion extends, and the first chassis has a third curved surface and the second chassis has a fourth curved surface that complementarily support the first curved surface and the second curved surface, respectively.

2. The foldable display device according to claim 1, wherein
   the support member includes a first abutting portion facing the first chassis and a second abutting portion facing the second chassis, and
   the first chassis and the second chassis include a third abutting portion and a fourth abutting portion, respectively, the third abutting portion and the fourth abutting portion are positioned away from the first abutting portion and the second abutting portion in a rotation direction with the display in the open state, respectively, and when the display is in the closed state, the third abutting portion and the fourth abutting portion abut on the first abutting portion and the second abutting portion, respectively.

3. The foldable display device according to claim 2, further comprising:
   an elastic cover member fixed to an end of the second chassis facing the first chassis, the first elastic cover member covering an outer side of the support member when the first chassis and the second chassis transition from the open state to the closed state and while the first chassis and the second chassis are in the closed state.

4. The foldable display device according to claim 2, further comprising:
   an elastic cover member fixed to an end of the second chassis facing the first chassis, the elastic cover member supporting the non-adhesive portion of the display while the first chassis and the second chassis are in the open state, the elastic cover member covering an outer side of the bent non-adhesive portion in a curved state while the first chassis and the second chassis are in the closed state.

5. The foldable display device according to claim 1, further comprising
   a first elastic cover member fixed to an end of the second chassis facing the first chassis, the first elastic cover member covering an outer side of the support member when the first chassis and the second chassis transition from the open state to the closed state and while the first chassis and the second chassis are in the closed state.

6. The foldable display device according to claim 5, further comprising:
   a second elastic cover member fixed to an end of the second chassis facing the first chassis, the second elastic cover member supporting the non-adhesive portion of the display while the first chassis and the second chassis are in the open state, the elastic cover member covering an outer side of the bent non-adhesive portion in a curved state while the first chassis and the second chassis are in the closed state.

7. The foldable display device according to claim 1, further comprising
   an elastic cover member fixed to an end of the second chassis facing the first chassis, the elastic cover member supporting the non-adhesive portion of the display while the first chassis and the second chassis are in the open state, the elastic cover member covering an outer side of the bent non-adhesive portion in a curved state while the first chassis and the second chassis are in the closed state.

8. The foldable display device according to claim 1, wherein
   the support member includes a first abutting portion facing the first chassis and a second abutting portion facing the second chassis, and
   the first chassis and the second chassis include a third abutting portion and a fourth abutting portion, respectively, the third abutting portion and the fourth abutting portion are positioned away from the first abutting portion and the second abutting portion in a rotation direction with the display in the open state, respectively, and when the display is in the closed state, the third abutting portion and the fourth abutting portion abut on the first abutting portion and the second abutting portion, respectively.

9. The foldable display device according to claim 1, wherein
   the support member includes a first abutting portion facing the first chassis and a second abutting portion facing the second chassis, and
   the first chassis and the second chassis include a third abutting portion and a fourth abutting portion, respectively, the third abutting portion and the fourth abutting portion are positioned away from the first abutting portion and the second abutting portion in a rotation direction with the display in the open state, respectively, and when the display is in the closed state, the third abutting portion and the fourth abutting portion abut on the first abutting portion and the second abutting portion, respectively.

10. The foldable display device according to claim 1, further comprising:
an elastic cover member fixed to an end of the second chassis facing the first chassis, the first elastic cover member covering an outer side of the support member when the first chassis and the second chassis transition from the open state to the closed state and while the first chassis and the second chassis are in the closed state.

11. The foldable display device according to claim 1, further comprising:
an elastic cover member fixed to an end of the second chassis facing the first chassis, the first elastic cover member covering an outer side of the support member when the first chassis and the second chassis transition from the open state to the closed state and while the first chassis and the second chassis are in the closed state.

12. The foldable display device according to claim 1, further comprising:
an elastic cover member fixed to an end of the second chassis facing the first chassis, the elastic cover member supporting the non-adhesive portion of the display while the first chassis and the second chassis are in the open state, the elastic cover member covering an outer side of the bent non-adhesive portion in a curved state while the first chassis and the second chassis are in the closed state.

13. The foldable display device according to claim 1, further comprising:
an elastic cover member fixed to an end of the second chassis facing the first chassis, the elastic cover member supporting the non-adhesive portion of the display while the first chassis and the second chassis are in the open state, the elastic cover member covering an outer side of the bent non-adhesive portion in a curved state while the first chassis and the second chassis are in the closed state.

* * * * *